(12) United States Patent
Grimaldi

(10) Patent No.: US 11,416,447 B2
(45) Date of Patent: Aug. 16, 2022

(54) DEDUPLICATING DISTRIBUTED ERASURE CODED OBJECTS

(71) Applicant: Hitachi Vantara LLC, Santa Clara, CA (US)

(72) Inventor: Kevin Canuette Grimaldi, Santa Clara, CA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 135 days.

(21) Appl. No.: 16/484,478

(22) PCT Filed: Jun. 8, 2017

(86) PCT No.: PCT/US2017/036476
§ 371 (c)(1),
(2) Date: Aug. 8, 2019

(87) PCT Pub. No.: WO2018/226228
PCT Pub. Date: Dec. 13, 2018

(65) Prior Publication Data
US 2020/0097445 A1 Mar. 26, 2020

(51) Int. Cl.
*G06F 16/13* (2019.01)
*G06F 16/909* (2019.01)
(Continued)

(52) U.S. Cl.
CPC .......... *G06F 16/137* (2019.01); *G06F 16/164* (2019.01); *G06F 16/1752* (2019.01); *G06F 16/909* (2019.01)

(58) Field of Classification Search
CPC .. G06F 16/1752; G06F 16/909; G06F 16/137; G06F 16/164
See application file for complete search history.

(56) References Cited

U.S. PATENT DOCUMENTS

| 5,522,031 A | * | 5/1996 | Ellis | G06F 11/1092 |
| | | | | 714/6.22 |
| 6,983,295 B1 | * | 1/2006 | Hart | G06F 11/1469 |
| | | | | 707/610 |

(Continued)

FOREIGN PATENT DOCUMENTS

| EP | 2 109 822 B1 | 6/2014 |
| EP | 2 765 524 A1 | 8/2014 |

(Continued)

OTHER PUBLICATIONS

International Search Report of PCT/US2017/036476 dated Aug. 21, 2017.

(Continued)

*Primary Examiner* — Hosain T Alam
*Assistant Examiner* — Anthony G Gemignani
(74) *Attorney, Agent, or Firm* — Mattingly & Malur, PC

(57) ABSTRACT

In some examples, a computer system may receive a data object including object data. For example, the system may be one of three or more systems and each system may be located at a different respective geographic location. The system may determine a value representative of the object data content. The system may further determine a plurality of chunks by dividing the object data into a plurality of data chunks based on a total number of the systems and determining a parity chunk for the plurality of data chunks. The system may determine a respective role value corresponding to each of the systems, and may send individual ones of the chunks to respective ones of the systems based on the role value and the value representative of the object data content. In some examples, each system may perform data deduplication independently of the other systems based on received chunks.

20 Claims, 17 Drawing Sheets

(51) Int. Cl.
*G06F 16/16* (2019.01)
*G06F 16/174* (2019.01)

(56) References Cited

U.S. PATENT DOCUMENTS

| | | | |
|---|---|---|---|
| 8,607,017 B2 | 12/2013 | Condict | |
| 9,104,676 B2 | 8/2015 | Yuan et al. | |
| 9,411,685 B2 | 8/2016 | Lee | |
| 9,600,201 B2 | 3/2017 | Yoshida et al. | |
| 2008/0133767 A1* | 6/2008 | Birrer | H04L 67/104 709/231 |
| 2013/0007008 A1* | 1/2013 | Yuan | G06F 16/9014 707/747 |
| 2013/0018854 A1* | 1/2013 | Condict | G06F 16/1752 707/692 |
| 2014/0052706 A1* | 2/2014 | Misra | G06F 3/0613 707/698 |
| 2014/0330889 A1* | 11/2014 | Brasche | H04L 67/1095 709/203 |
| 2014/0344229 A1* | 11/2014 | Lillibridge | G06F 16/1752 707/692 |
| 2015/0095346 A1 | 4/2015 | Kimmel et al. | |
| 2015/0149819 A1* | 5/2015 | Lee | G06F 11/1076 714/6.24 |
| 2015/0324123 A1 | 11/2015 | Storer et al. | |
| 2016/0188241 A1* | 6/2016 | Bennett | G06F 3/0614 711/114 |
| 2016/0283372 A1 | 9/2016 | Davis | |
| 2016/0344413 A1* | 11/2016 | Wideman | G06F 3/0641 |

FOREIGN PATENT DOCUMENTS

WO 2008/070173 A1 6/2008
WO PCT/JP2014/058861 * 3/2014

OTHER PUBLICATIONS

Extended European Search Report received in corresponding European Application No. 17912731.1 dated Mar. 24, 2021.
Communication Pursuant to Article 94(3) EPC received in corresponding European Application No. 17 912 731.1 dated Jun. 10, 2022.

* cited by examiner

DEDUPLICATING DISTRIBUTED ERASURE CODED OBJECTS

TECHNICAL FIELD

This disclosure relates to the technical fields of data protection and data deduplication.

BACKGROUND

Data objects may be stored in an object storage architecture that manages data as objects. Each object typically includes the object data (e.g., the data content), metadata that describes the object data, and a globally distinguishable identifier. In some situations, stored object data may be erasure coded to provide redundancy protection against loss of the data. Erasure coding may include dividing the data into a plurality of data chunks. Parity data is encoded for the data chunks, and the data chunks and the parity data may be stored across a set of different storage locations, such as on different storage mediums and/or at different geographic locations. If a data chunk of the object data at one of the storage locations becomes corrupted, destroyed, or is otherwise unavailable, the object data may still be reconstructed by using the parity data that is stored at another one of the storage locations.

In addition, deduplication of data may be used to reduce the amount of data in a computer system. As an example, if the computer system determines that new data is the same as data that has already been received by the computer system, the system may link information about the new data to the data already received by the computer system, and may thereby avoid storing or otherwise having to maintain the new data. As one example, the computer system may only add metadata about the new data along with a pointer to the previously received data, rather than having to add or keep the entire data content.

SUMMARY

Some implementations include a distributed topology of systems able to store chunks for data objects. For instance, a computer system may receive a data object including object data and object metadata. The system may be one of three or more systems and each system may be located at a different respective geographic location. The system may determine a value representative of the object data content. The system may further determine a plurality of chunks by dividing the object data into a plurality of data chunks based on a total number of the systems and may determine at least one parity chunk for the plurality of data chunks. The system may determine a respective role value corresponding to each of the systems in the distributed topology, and may send individual ones of the chunks to respective ones of the systems based on the role value and the value representative of the object data content. In some examples, each system may perform data deduplication independently of the other systems based on the received chunks and chunks already stored by the respective system.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION OF THE EMBODIMENTS

Figure 1:
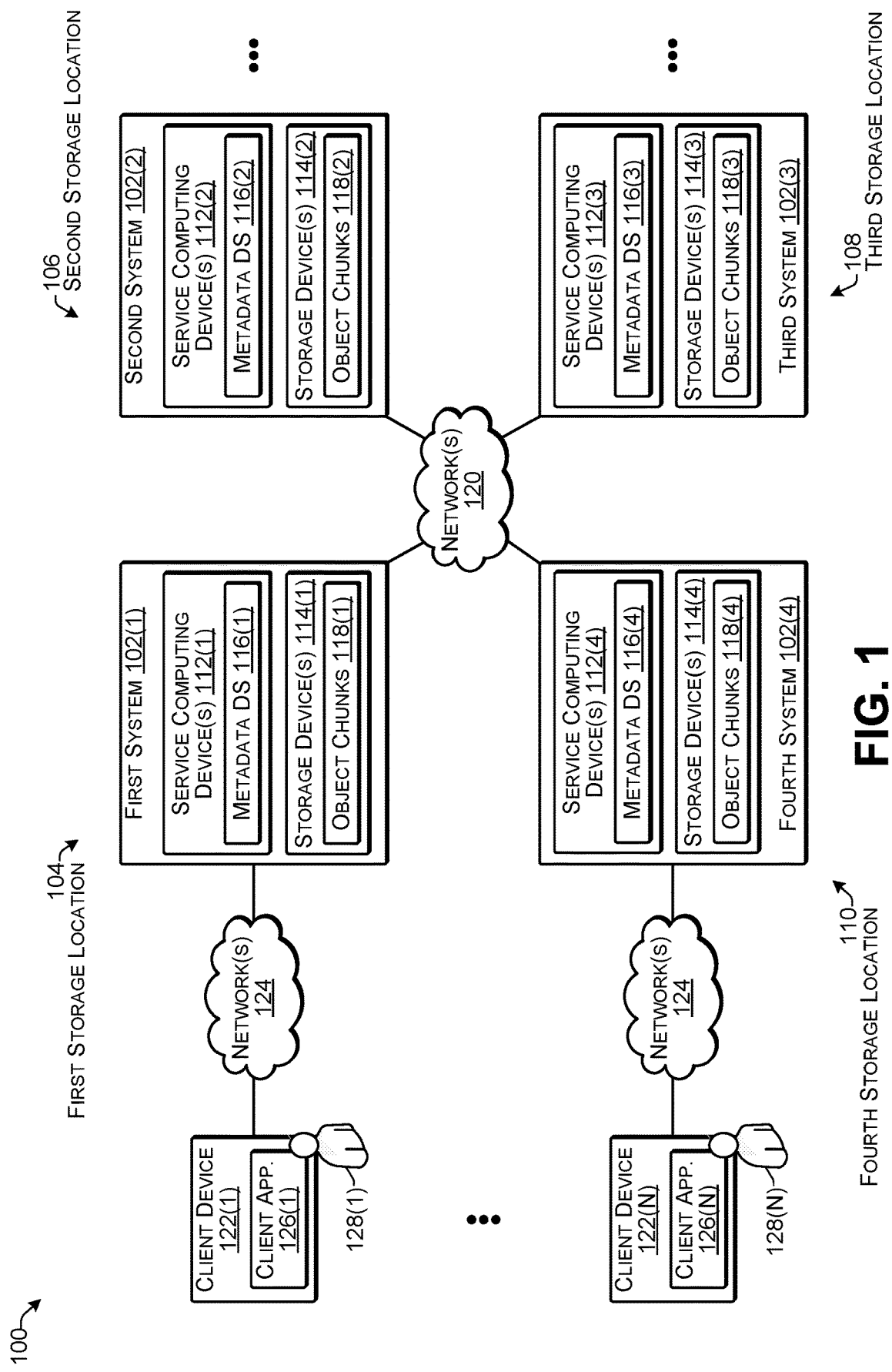
FIG. 1 illustrates an example architecture of a system for storing and deduplicating erasure coded objects according to some implementations.

Some implementations herein include techniques and arrangements for distributing object chunks to systems configured in a geographically distributed erasure coding topology of storage locations. Examples herein provide for deduplication in the distributed topology by ensuring that duplicate chunks for objects with duplicate object data are stored at the same respective system in the distributed topology, thereby enabling duplicate data content to be identified and removed by the system locally. In addition, some examples balance a computational load associated with reconstructing object data using parity chunks in place of data chunks across all the systems in the distributed topology. Thus, implementations herein avoid penalizing any one system with the computational penalty that would be result from a static assignment of chunk storage roles, such as having all parity chunks stored at the same system.

Some examples herein provide distributed object storage that uses geo-distributed erasure coding. The object data stored in the distributed topology herein may be divided into chunks, and the chunks may be dispersed across the distributed topology. The distributed topology herein may include a fixed number of systems able to store the chunks, each located at a different geographic storage location. Thus, the chunks of an object may be distributed across the fixed number of systems, such that each system receives and maintains either one of the data chunks of the object or a parity chunk determined from the data chunks.

When the object data is reduced to erasure coded data chunks, the object data may be reduced to the same number of chunks (including a parity chunk) as there are storage locations and systems in the topology, and therefore, each system in the topology may store exactly one of the chunks of an object. Accordingly, the object storage techniques herein may protect against data loss resulting from a complete loss of a system at one of the storage locations, and further, provides that protection while consuming a smaller amount of storage than, for example, would be consumed by storing full copy of the object data.

As one example, rather than having each system in the distributed topology have a fixed chunk responsibility, the respective systems in the distributed topology herein may have dynamic chunk responsibilities. As a result, each system may be responsible for storing any number of data chunks or parity chunks. However, for any two objects with the same data, each system herein may have a fixed chunk responsibility based on assigned roles. Thus, for any two objects having the same data, e.g., object 1 and object 2, if a first chunk of object 1 is stored on particular system in the distributed topology (e.g., system "D"), then the first chunk of object 2 is also stored on system "D", rather than possibly being stored on one of the other systems instead.

In some examples, distribution of the chunks to particular ones of the systems in the distributed topology may be achieved, at least partially, by using a deterministic hashing algorithm such as SHA-256, MD5, or the like. For instance, when the deterministic hashing algorithm is applied to the object data, the result is a hash value (i.e., a "hash") that is representative of the data content of the object data. Due to the nature of the hash algorithms used, it is extremely unlikely that applying these hashing algorithms to any two sets of data with different content would result in the same hash value. Further, applying these hashing algorithms to any two sets of data with identical content is guaranteed to result in the same hash value (i.e., the hash algorithms are deterministic and provide a result based on the content to which the algorithm is applied). After the hash value for the object data has been computed, the hash value may be used for determining, for each chunk, a target system in the distributed topology.

Based on the hash value, a mapping may be determined for each chunk to a respective one of the systems in the distributed topology. The mapping technique is consistent such that for the same hash value, the chunks are distributed to the same system locations. As one example, a modulo operation may be applied for determining the corresponding system location for each chunk. For example, in a distributed topology with four different storage locations, the system that receives the object and distributes the chunks may compute the hash value and apply modulo(4) to the hash value, where the modulo value applied is equal to the number of different systems in the distributed topology. In the case of "hash value mod(4)", the result of this computation is an integer between 0 and 3.

Each different storage location/system may be assigned a respective role, i.e., 0, 1, 2 or 3. Further, the object data may be divided into a number of chunks based on the number of different storage locations. For example, if there are M storage locations/systems, the object data may be divided into M−1 data chunks, and one parity chunk may be generated for the M−1 data chunks. The first data chunk of the object data may be stored at the system having a role value that matches the result of the modulo computation. Each subsequent data chunk of the object is stored at each subsequent storage location with the next highest role number, and the parity chunk may be stored last in the sequence. If there are no storage locations with a higher role value, then the next chunk is stored at the system with role value=0.

The hashing algorithm may return hash values that are adequately random to ensure an even distribution of parity chunks across all the systems in the distributed topology. Thus, no one system in the distributed topology is likely to have a much larger percentage of parity chunks than the other systems, thereby more evenly distributing the computing burden when the data objects are reconstructed using a parity chunk in place of a data chunk. Furthermore, the method of distributing chunks described herein guarantees that all duplicate chunks from duplicate object data will be stored at the same system in the distributed topology. Accordingly, in the examples herein, each system may perform deduplication locally, and there is no requirement for global deduplication management across the distributed topology. Furthermore, in the example in which there are four systems, the amount of storage used to provide data protection in this example is 1.33 times the original object data size, a significant savings over 2 times the size that would be used by storing a full copy of the object data.

For discussion purposes, some example implementations are described in the environment of a plurality of systems in communication with each other for storing and deduplicating erasure coded object data. However, implementations herein are not limited to the particular examples provided, and may be extended to other types of computing and storage system architectures, other types of storage environments, other types of client configurations, other types of data, and so forth, as will be apparent to those of skill in the art in light of the disclosure herein.

FIG. 1 illustrates an example architecture of a distributed storage topography 100 configured for storing and deduplicating objects according to some implementations. A plurality of systems 102 are arranged in the distributed topology at a plurality of respective storage locations 104-110. For example a first system 102(1) is located at a first storage location 104; a second system 102(2) is located at a second storage location 106; a third system 102(3) is located at a third storage location 108; and a fourth system 102(4) is located at a fourth storage location 110. Furthermore, while four systems and storage locations are illustrated in this example, the number of systems and storage locations in other examples is not limited to four, and may be three or more systems, such as ranging between 3 and 300 systems.

Each system 102 may include at least one service computing device 112 and at least one storage device 114. Accordingly, one or more service computing devices 112(1) and one or more storage devices 114(1) may be included in the first system 102(1); one or more service computing devices 112(2) and one or more storage devices 114(2) may be included in the second system 102(2); one or more service computing devices 112(3) and one or more storage devices 114(3) may be included in the third system 102(3); and one or more service computing devices 112(4) and one or more storage devices 114(4) may be included in the fourth system 102(4). Furthermore, while the service computing device(s) 112 and the storage device(s) 114 are illustrated separately in this example, in other examples, the storage device(s) 114 may be incorporated into or otherwise included in the service computing devices(s) 112, as discussed additionally below. Further, the systems 102 are not limited to the hardware configurations described and illustrated in this disclosure, but may include any suitable or desired hardware configuration able to serve as object storage and perform the functions described herein, and the hardware configuration at one of the systems 102 may be different from that at another one of the systems 102.

At least one service computing device 112 in each system 102(1)-102(4) includes, maintains, or otherwise accesses a metadata data structure 116 that is used to store metadata about a plurality of object chunks 118 that are stored on the storage device(s) 114 at the respective systems 102(1)-102(4). For example, the metadata data structure 116 may be a database, a table, or any other suitable data structure. The metadata included in the metadata data structure 116 may include information about each object and/or a corresponding object chunk, such as path, name, owner, hash value determined from the object data, and so forth. In addition, as discussed additionally below, the metadata data structure 116 may include deduplication metadata for supporting deduplication at each system 102(1)-102(4). For example, during deduplication, when an object chunk is identified as being a duplicate of an object chunk already stored at a system 102, a metadata entry in the metadata data structure 116 may be created and/or maintained for the duplicate chunk, but the object data of the duplicate chunk itself may be deleted, and a pointer may be added in the metadata database 116 for the duplicate chunk that points to the object data of the chunk already stored by the system. Deduplication techniques are discussed additionally below.

The systems 102(1)-102(4) are able to communicate with each other over one or more networks 120. The one or more networks 120 may include any suitable network, including a wide area network, such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 120 may include both wired and/or wireless communication technologies. Components used for such communications can depend at least in part upon the type of network, the environment selected, or both. Protocols for communicating over such networks are well known and will not be discussed herein in detail. Accordingly, the service computing devices 112 are able to communicate over the one or more networks 120 using wired or wireless connections, and combinations thereof.

In addition, at least some of the service computing devices 112 are able to communicate with client devices 122(1)-122(N) through one or more networks 124. Each client device 122(1)-122(N) may include a respective instance of a client application 126(1)-126(N) that may execute on the respective client device 122(1)-122(N), such as for communicating with a respective service computing device 112, e.g., for sending data objects for storage on the systems 102 and/or for receiving stored objects from the systems 102. In some cases, the application 126 may include a browser or may operate through a browser, while in other cases, the application 126 may include any other type of application having communication functionality enabling communication with the service computing devices 112 over the one or more networks 124.

The one or more networks 124 may be a LAN in some examples. In other examples, the one or more networks 124 may be any of the networks discussed above with respect to the one or more networks 120. In some cases, the users 128 and/or the client devices 112 or client applications 126 may be assigned to access the service computing device(s) 112 at a particular storage location of the plurality of storage locations 104-110. For example, if the storage location 104 is located in Boston, and the user 128(1) is an employee who works in the Boston area, the user 128(1) may be assigned to access the service computing device(s) 112(1), rather than the other service computing devices 112(2)-112(4) at the other storage locations 106-110, respectively. As one example, various users 128 or groups of users may only be granted access to certain ones of the service computing device(s) 112 at certain ones of the storage locations 104-110, such as for load balancing, limiting employee access to the local office system, and so forth. Furthermore, while four systems 102(1)-102(4) and storage locations 104-110 are shown in this example, in other examples, a different number of systems/storage locations may be used, such as three or more, with the upper limit being based on practically and diminishing returns, rather technical feasibility.

Figure 2:
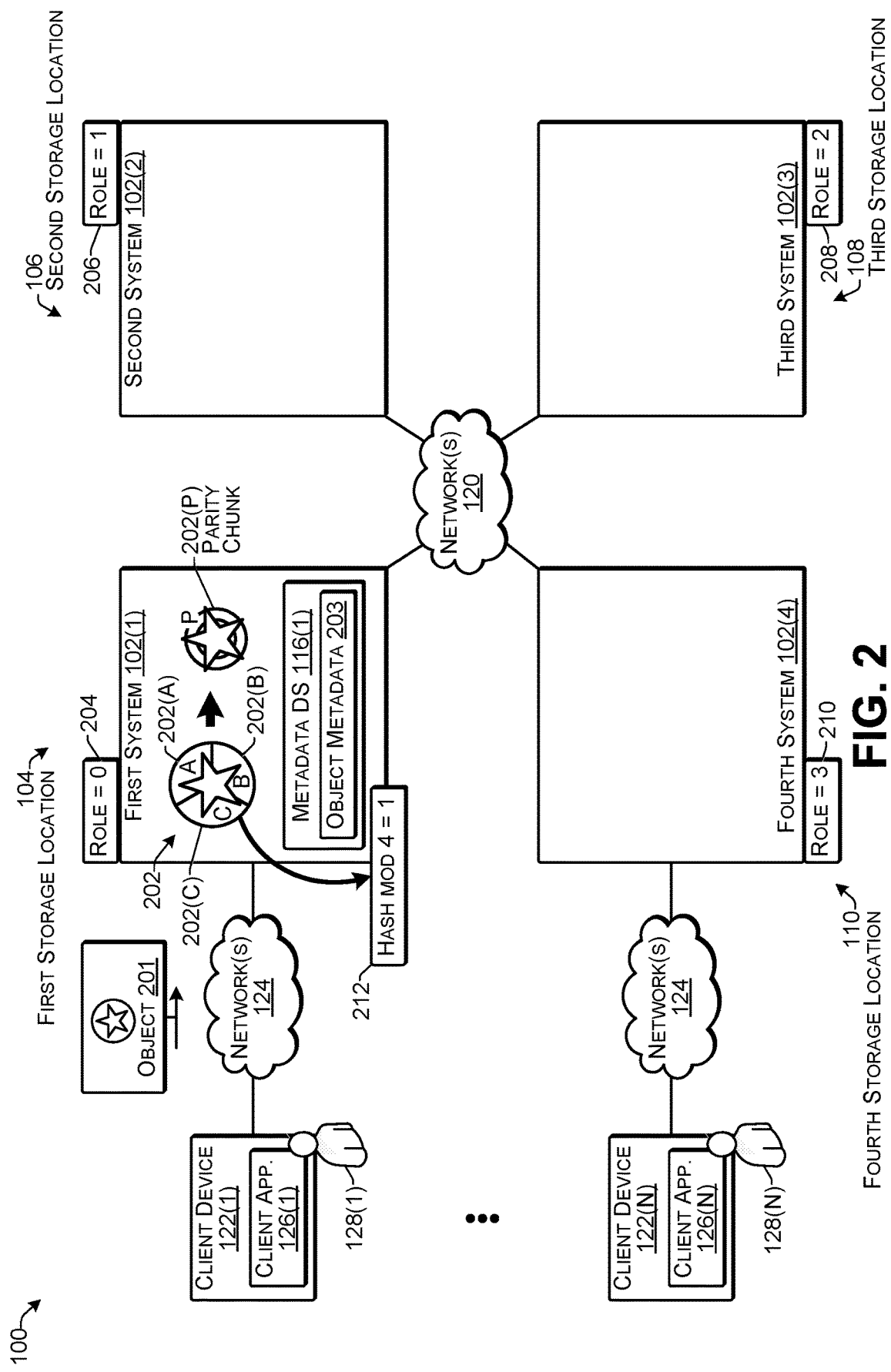
FIG. 2 illustrates an example of dividing an object into data chunks and determining a parity chunk according to some implementations.

FIG. 2 illustrates an example of dividing an object into data chunks and determining a parity chunk according to some implementations. In this example, suppose that the user 128(1) sends an object 201 to the first system 102(1). The first system 102(1) receives the object 201 from the client device 122(1). For example, the object 201 may include object data 202 and object metadata 203. The object metadata 203 may include an object identifier, an object type, object size, object owner, creation date, and so forth, as mentioned above. In the examples herein, "object data" may refer exclusively to an object's data content and may exclude the object metadata. Similarly, the object metadata may exclude the object data.

In the illustrated example, for purposes of distributing data chunks among the systems 102 in the distributed topology 100, the first system 102(1) has a role value equal to 0, as indicated at 204; the second system 102(2) has a role value equal to 1, as indicated at 206; the third system 102(3) has a role value equal to 2, as indicated at 208; and the fourth system 102(4) as a role value equal to 3 as indicated at 210. These role values may be assigned by a system administrator or through other techniques, but typically will remain constant to enable implementation of the deduplication techniques described herein.

The first system 102(1) divides the object data 202 of the object 201 into three approximately equally sized object data chunks, i.e., data chunk 202(A), data chunk 202(B), and data chunk 202(C). In some cases, each chunk 202(A)-202(C) may contain contiguous bytes from the original object data 202. As one simple example, if a 999 byte file is divided into three chunks, chunk 202(A) may contain bytes 0-332, chunk 202(B) may contain bytes 333-665, and chunk 202(C) may contain bytes 666-998. To reconstruct the original object data from the three data chunks 202(A)-202(C), the first system 102(1) (or another one of the systems 102) may simply concatenate chunks 202(A)+202(B)+202(C). Accordingly, reconstructing complete object data from a plurality of data chunks may incur a very low computational overhead. An alternative technique for dividing the object data into chunks is discussed below with respect to FIG. 13.

The first system 102(1) may use the data chunks 202(A)-202(C) to compute a parity chunk 202(P). The parity chunk 202(P) may typically be approximately the same size as an individual one of the data chunks 202(A)-202(C). Accordingly, in the illustrated example including four storage locations, the parity chunk 202(P) and any two of the data chunks 202(A)-202(C) may be used to compute object data of the remaining data chunk. This is achieved by applying a mathematical formula. As a simplified example, consider the following equation: A+B+C=P. Given values for A, B, and C, it is possible to compute the parity P, for example 2+3+4=P, therefore P=9. If any single value is lost, it can be computed using the known values and the parity, 2+B+4=9, therefore B=3. As one example, as is known in the art, parity data may be computed for the data chunks 202(A)-202(C) using an exclusive OR function (XOR) for determining the parity data. Consequently, if one of the data chunks 202(A), 202(B), or 202(C) is unavailable, the object data 202 may still be reconstructed using the parity chunk 202(P) and the other two data chunks. Furthermore, while a single parity chunk is used in this example, in other examples, there may be multiple parity chunks.

The first system 102(1) may further compute a hash value from the object data 202. As mentioned above, the system 102(1) may use any of a number of well-known deterministic hash algorithms such as the SHA-256 algorithm, the MD5 algorithm, or the like. Furthermore, as indicated at 212, the first system may compute the modulo(4) of the hash value determined using the hash algorithm. The result of this computation will always be an integer ranging from 0 to 3. For example, since there are four systems 102(1)-102(4), modulo(4) is used. If there were five systems, modulo(5) may be used, if there were six systems, modulo (6) may be used, and so forth. Accordingly, the result determines which storage location is assigned for storing the first chunk of the erasure coded object data.

Furthermore, using the formula "hash value modulo(number of systems)" and placing the first data chunk at the system matching the result is not the only way to consistently distribute the chunks herein. For example, the system may start a delivery sequence with any of the data chunks and not necessarily the first data chunk, may start with the parity chunk, may distribute the chunks in a descending order of role values, rather than ascending order, and so forth. Additionally, rather than using the modulo of the number of systems, the modulo may be determined using the number of possible permutations for placement of the chunks, or the like. Furthermore, other types of functions from hash values to permutations of chunk assignments with approximately even distribution of parity sites may be used. Accordingly, numerous other variations will be apparent to those of skill in the art having the benefit of the disclosure herein.

In this example, suppose that the hash value mod(4) is equal to 1. This means that the storage location having the assigned storage role value=1 in the distributed topology (i.e., second system 102(2) in the illustrated example) is responsible for storing chunk 202(A) of the object data of object 201. Each subsequent chunk, with the parity chunk being the last in the sequence, may be stored on each subsequent system 102 with the next highest role value, respectively. If there are no systems with a higher role value then the next chunk is stored on the storage system with role value=0. Thus, the first system 102(1) may reduce the object data to the data chunks 202(A)-202(C) and the parity chunk 202(P), and transmit the chunks over the one or more networks 120 to the other systems 102(2), 102(3), and 102(4) based on correspondence with the assigned role values of the systems.

Figure 3:
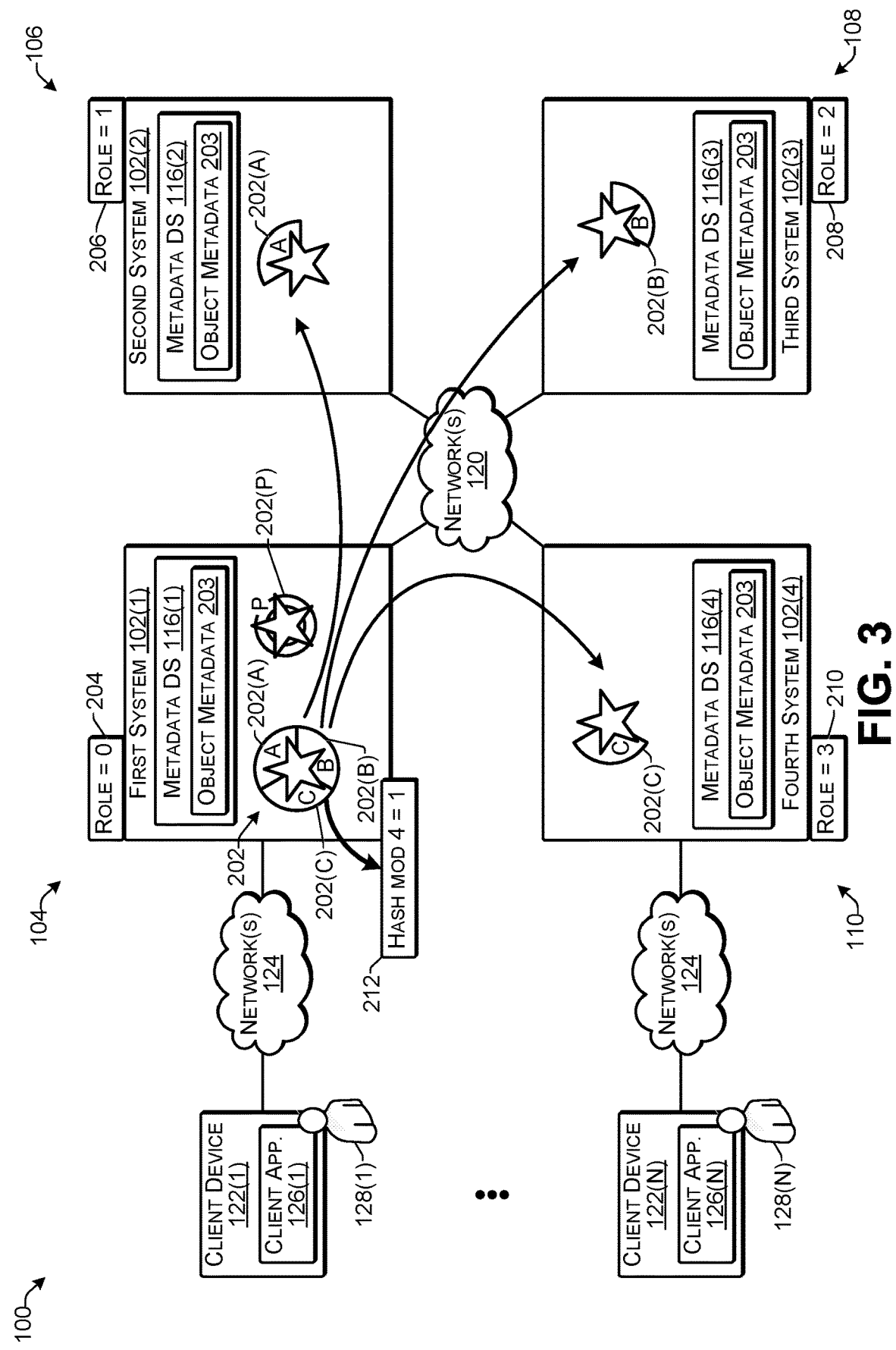
FIG. 3 illustrates an example of geographically distributing object chunks according to some implementations.

FIG. 3 illustrates an example of geographically distributing object chunks according to some implementations. After reducing the object data to the data chunks 202(A), 202(B), and 202(C), and the parity chunk 202(P), individual ones of the chunks may be sent to separate ones of the systems 102(2)-102(4) in the system topology 100 according to the distribution mapping technique discussed above. As mentioned above, each system 102 may store a single one of the object chunks 202(A), 202(B), 202(C), or 202(P) based on the mapping function determined from the hash of the object data and the assigned role values assigned to each of the systems 102(1)-102(4) at the respective storage locations 104-110. In addition, when each object chunk is sent to the other systems 102(2)-102(4), the sending system 102(1) may also send the object metadata 203 associated with the object 201 and the particular chunk. The object metadata 203 send to each system 102(2)-102(4) may include the types of object metadata described above and also the hash value determined for the object data 202.

In this example, the modulo(4) of the hash value is equal to 1, which corresponds to the role value assigned to the second system 102(2), as indicated at 206. Accordingly, the first system 102(1) sends the first data chunk 202(A) of the object data to the second system 102(2), and distributes the remaining chunks of the object in sequence according to increasing role values until there is no higher role value, at which point the first system 102(1) continues distribution starting at role 0. Accordingly based on this technique the third system 102(3) having a role value equal to 2, receives the second chunk 202(B); the fourth system 102(4) having a role value equal to 3 receives the third data chunk 202(C), and the first system 102(1) having a role value equal to 0 retains the parity chunk 202(P).

The object metadata 203 may be sent with the respective object chunks, or separately therefrom. The respective systems receive the metadata 203 and store it in their respective metadata data structures 116 in association with the received object chunk. Furthermore, while using "hash value modulo (4)" is described herein as one technique for establishing consistent mapping between the data chunks and the plurality of systems 102 based on the content of the object data, various other mapping techniques will be apparent to those of skill in the art having the benefit of the disclosure herein. Accordingly, implementations herein are not limited to the particular technique described.

Figure 4:
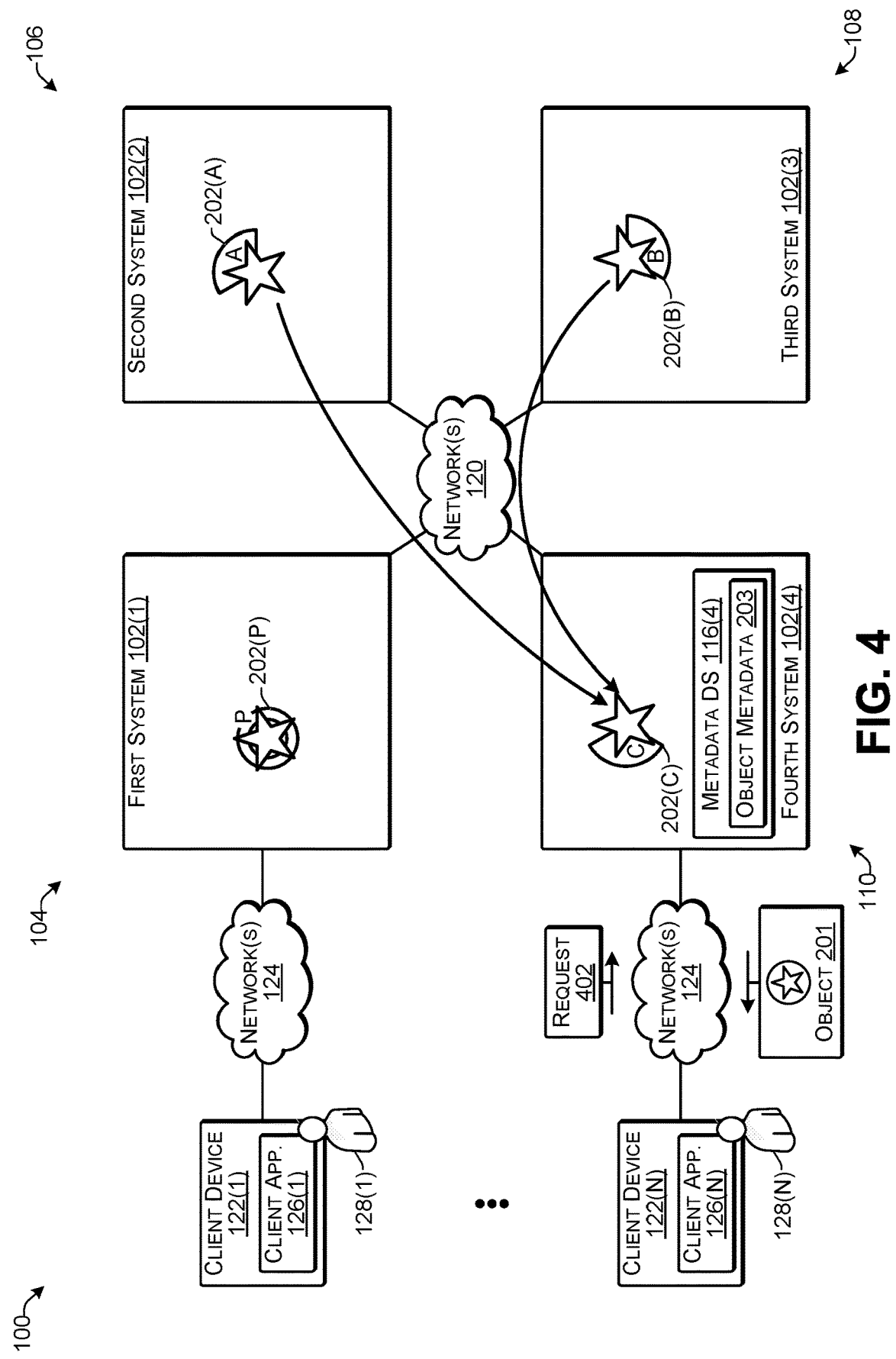
FIG. 4 illustrates an example of reconstructing object data from geographically distributed chunks according to some implementations.

FIG. 4 illustrates an example of reconstructing an object from geographically distributed chunks according to some implementations. When a stored object from one of the object storage systems 102 in the distributed topology 100 is requested by a user 128, the system 102 that receives the request may use a locally stored chunk plus two additional data chunks retrieved from other systems 102 at other respective storage locations to recreate the object data 202 from the chunks. To limit the network bandwidth consumed by this activity, the reconstructing system 102 may retrieve, from the remote systems 102, the minimum number of chunks needed to recreate the original object data. The local chunk may be either a data chunk or a parity chunk. However, when the local chunk is a parity chunk, the system typically incurs additional overhead resulting from computing the missing data chunk for being able to reconstruct the object data 202.

In the illustrated example, suppose that the fourth system 102(4) receives a request 402 from the client device 122(N)

requesting to access the object 201. In response to receiving the request, the fourth system 102(4) may determine that it has the data chunk 202(C) of the requested object 201, and requires two additional chunks for reconstructing the object data 202. Based on the object metadata 203 that the fourth system 102(4) received with the data chunk 202(C), the fourth system may determine the locations of the other data chunks 202(A) and 202(B), and the parity chunk 202(P) of the object data 202. As one example, the fourth system 102(4) may use the object data hash value received with the object metadata 203, and may calculate the modulo(4) of the hash value to determine which of the other systems store which of the other chunks.

Accordingly, to reconstruct the object data with the minimum amount of computational processing, the fourth system 102(4) may retrieve the two other data chunks 202(A) and 202(B) from the systems 102(1) and 102(2), respectively, in the distributed topology 100. As one example, the fourth system 102(4) may determine the location of the two other data chunks based on the hash value included in the object metadata 203 and by applying the modulo(4) operation discussed above for determining which systems 102 maintain the data chunks rather than the parity chunk. Upon receiving the two other data chunks, the fourth system 102(4) may then simply concatenate the three data chunks 202(A), 202(B), and 202(C) together to recreate the original object data. The fourth system 102(4) may then respond to the request 402 from the client computing device 122(N) by sending the object 201, including the reconstructed object data 202 and any relevant object metadata 203, such as the object identifier, or the like, to the requesting client computing device 122(N).

Figure 5:
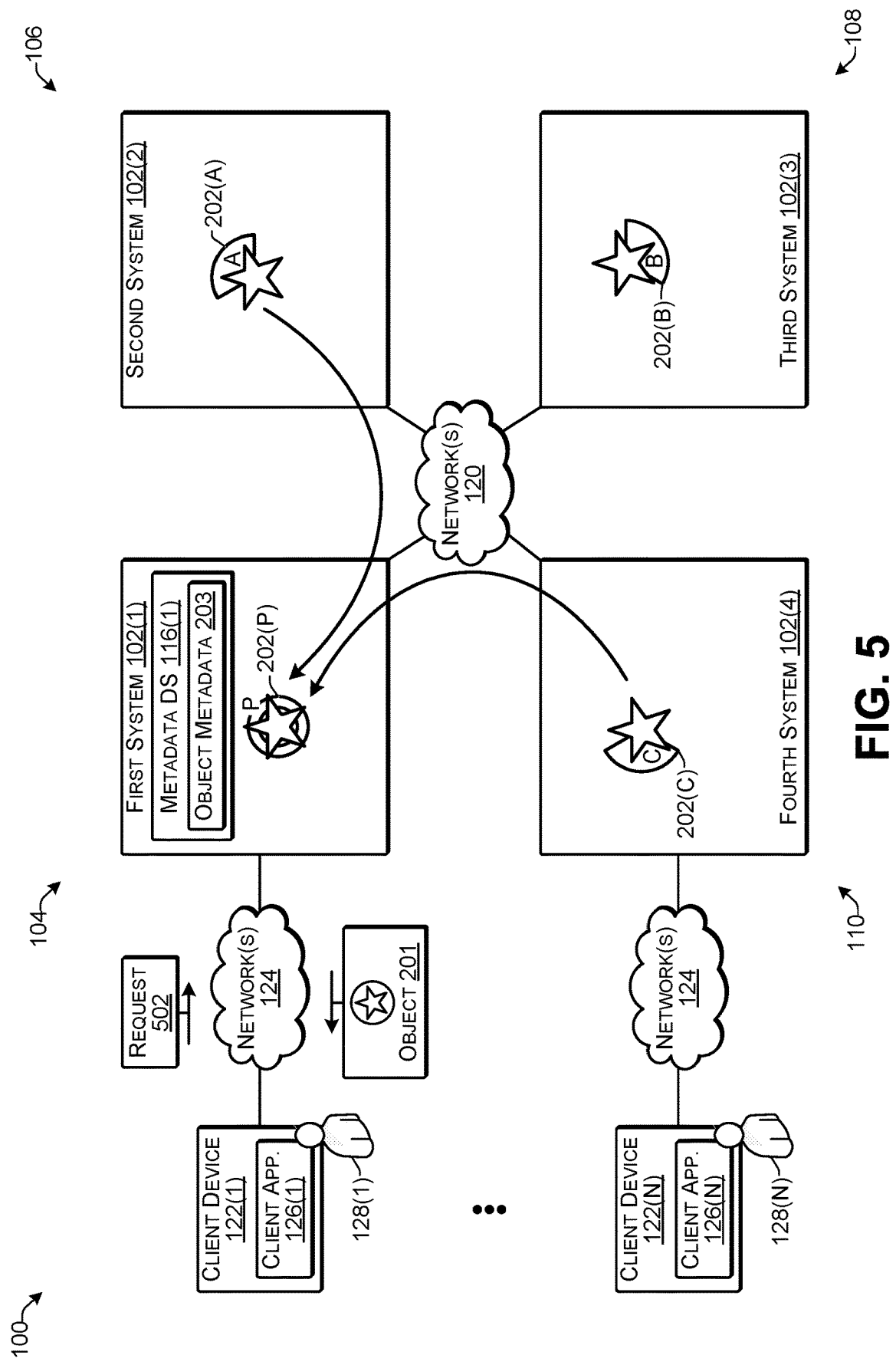
FIG. 5 illustrates an example of reconstructing object data from geographically distributed chunks including a parity chunk according to some implementations.

FIG. 5 illustrates an example of reconstructing an object from geographically distributed chunks including a parity chunk according to some implementations. In this example, suppose that the user 128(1) at the first client device 122(1) sends a request 502 to the first system 102(1) to request to access the object 201. Furthermore, as one example, suppose that a failure has occurred at the third system 102(3), which results in chunk 202(B) being corrupted, lost, or otherwise unavailable at the time that the request 502 is received. The first system 102(1) may obtain the first data chunk 202(A) and the third data chunk 202(C) from the second system 102(2) and the fourth system 102(4), respectively, as discussed above with respect to FIG. 4. The first system 102(1) may then reconstruct the object data 202 using the first chunk 202(A), the third chunk 202(C), and the parity chunk 202(P).

Reconstructing the object data using the parity chunk 202(P) may typically incur a higher computational overhead than if chunk 202(B) were available, as the missing data chunk 202(B) may be first computed using the parity chunk 202(P) and the other two chunks 202(A) and 202(C). Reconstructing the object data 202 using the parity chunk 202(P) as opposed to using the data chunk 202(B) may also typically require more time than retrieving the data chunk 202(B). However, in some cases, the increased computational overhead and time delay may be balanced against system and network latency, network congestion, and the like. For example, it may be the case that the system 102(3) is located some distance geographically from the first system 102(1), or over a slow network connection, or over a number of network hops, such that even if the data chunk 202(B) is available, retrieval of the data chunk 202(B) may take longer than computing the data chunk 202(B) using the parity chunk 202(P). Consequently, in such a situation, the first system 102(1) may merely retrieve two of the data chunks that may be retrieved the quickest, and use the parity chunk 202(P) and the two retrieved data chunks for reconstructing the object data. In some examples, each system 102 may maintain network latency information for determining whether to use a parity chunk for reconstructing the object data or whether to retrieve a data chunk instead of using the parity chunk.

Figure 6:
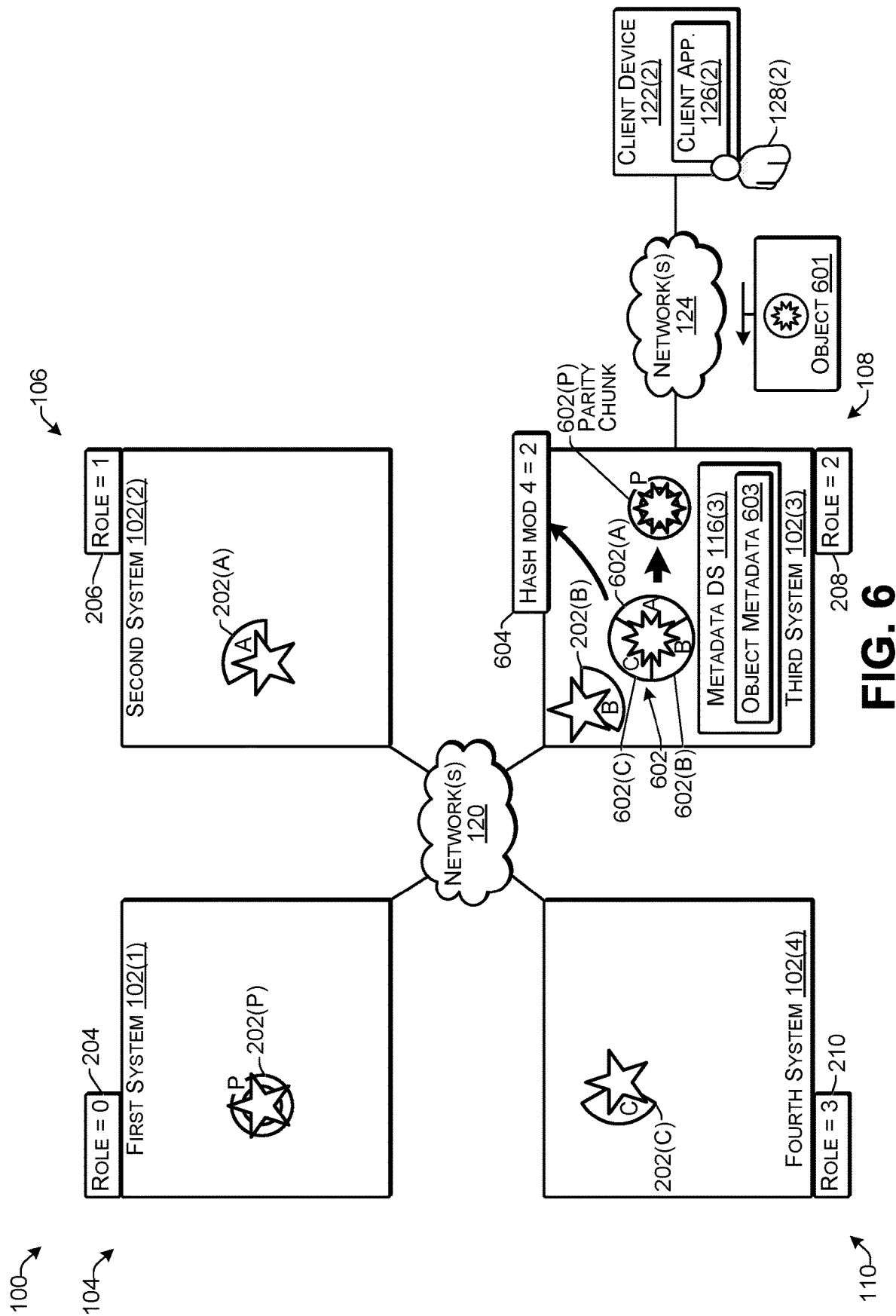
FIG. 6 illustrates an example of dividing an object into data chunks and determining a parity chunk according to some implementations.

FIG. 6 illustrates an example of dividing an object into data chunks and determining a parity chunk according to some implementations. In this example, suppose that the user 128(2) sends a second object 601 with object data 602 and metadata 603 in which the object data 602 is different from that of the first object 201 discussed above. For instance, suppose that the user 128(2) uses the client device 122(2) to send the object 601 to the third system 102(3). The third system 102(3) may store the object metadata 603 in its metadata data structure 116(3) and may store the object data 602 separately from the metadata.

Furthermore, the third system 102(3) may compute a hash value for the object data 602 using the same hash algorithm as was used by the first system 102(1) in the example discussed above with respect to FIGS. 2 and 3. Next, the third system 102(3) may determine the hash value modulo (4) for the object data 602. In this example, suppose that the result of the calculation of the hash modulo(4) returns a result of 2, as indicated at 604.

In addition, the system 102(3) may divide the object data 602 into three data chunks 602(A), 602(B), and 602(C). Furthermore, the system 102(3) may calculate a parity chunk 602(P) for the three data chunks 602(A)-602(C), as discussed above. The system 102(3) is then ready to distribute the data chunks and/or the parity chunk to the other systems 102 in the distributed topology 100 as discussed additionally below with respect to FIG. 7.

Figure 7:
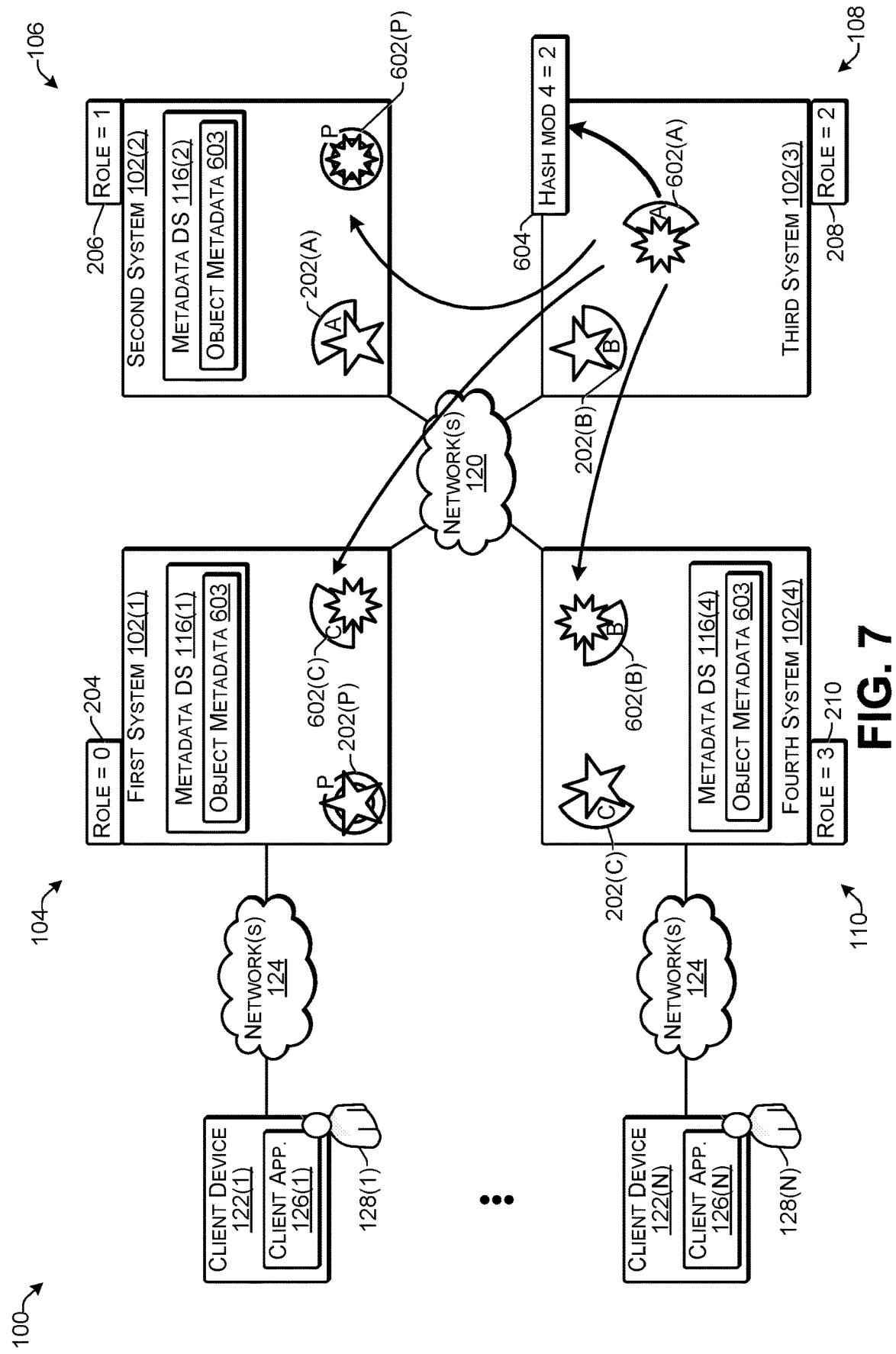
FIG. 7 illustrates an example of geographically distributing object chunks according to some implementations.

FIG. 7 illustrates an example of geographically distributing object chunks according to some implementations. As mentioned above, the technique described herein for distributing the object chunks may result in an approximately random chunk storage distribution. Because of this substantially random distribution, the computational penalty associated with storing parity chunks is evenly distributed among all of the systems 102 in the distributed topology 100.

In this example, based on the calculation of the hash value mod(4) being equal to 2, the first data chunk 602(A) is retained at the third system 102(3), since the third system 102(3) has a role value equal to 2, as indicated at 208. The remaining chunks are distributed in sequence in a round robin manner such that the second data chunk 602(B) is sent to the fourth system 102(4) having a role value equal to 3, as indicated at 210; the third data chunk 602(C) is sent to the first system 102(1) having a role value equal to 0, as indicated at 204; and the parity chunk 602(P) is sent to the second system 102(2) having a role value equal to 1, as indicated at 206. Furthermore, as discussed above the object metadata 603 for the object 601 may also be sent to each of the respective systems 102(4), 102(1), and 102(2) with the respective chunk 602(B), 602(C), and 602(P), or in a separate transmission.

Figure 8:
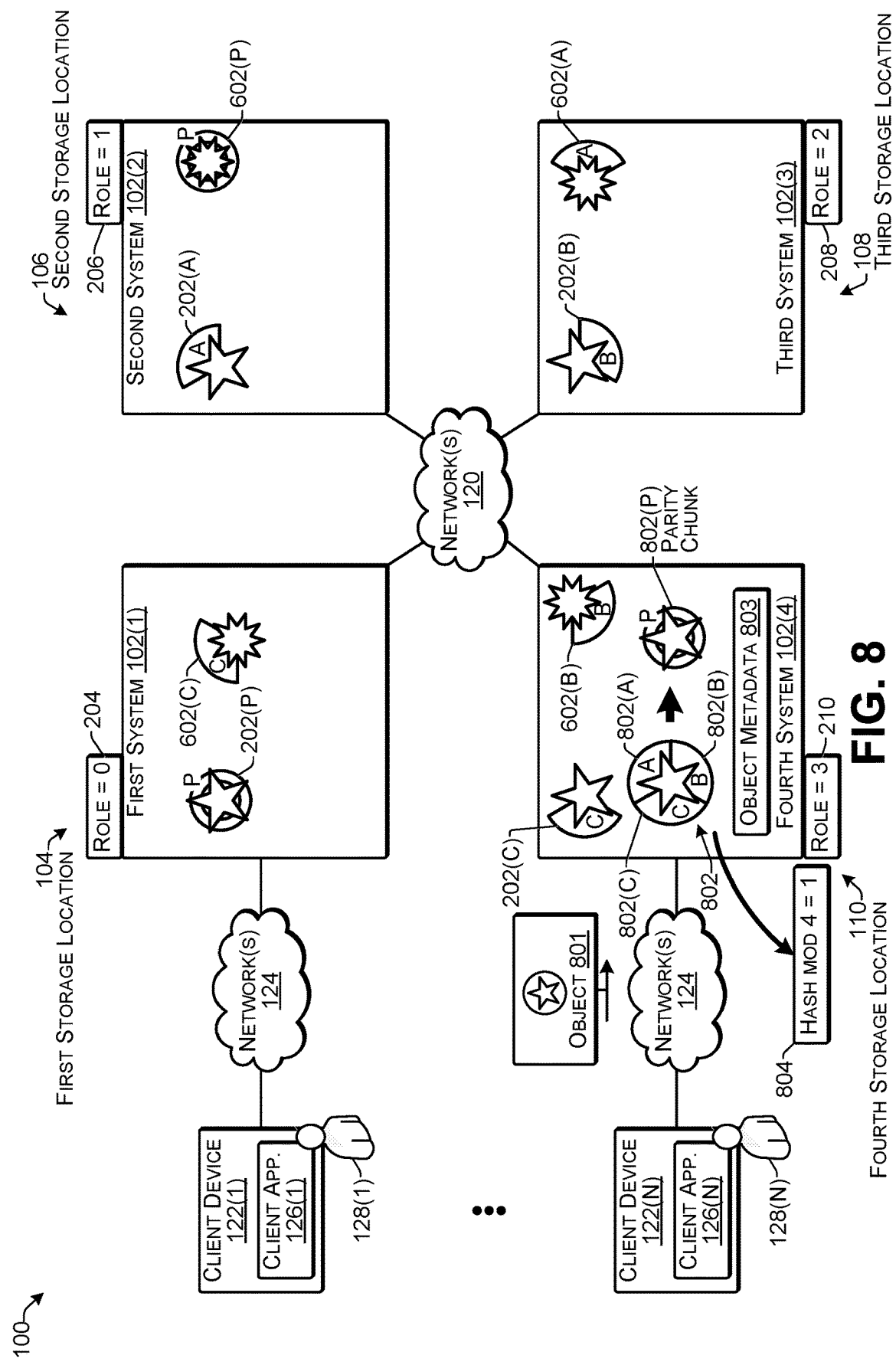
FIG. 8 illustrates an example of dividing an object into data chunks and determining a parity chunk according to some implementations.

FIG. 8 illustrates an example of dividing an object into data chunks and determining a parity chunk according to some implementations. In an object storage system, it is possible to dramatically reduce the amount of storage consumed by object data by using deduplication techniques. As one example, file-based deduplication may be performed by comparing the content data of different objects that are received by the object storage system. If the system determines that the content of the data is the same for multiple objects, the object storage system can eliminate duplicate data from the object storage system by linking metadata for the multiple objects with duplicate data to a single instance of the object data content on the storage.

Using the techniques described herein, when objects with duplicate data are reduced to the erasure coded chunks, the resulting chunks are also duplicates. However, if the erasure coded chunks are randomly distributed across a plurality of storage systems in a distributed topology, then the duplicate chunks may be stored at multiple different storage locations, thereby making it difficult to identify and eliminate duplicate data. Implementations herein address this issue by ensuring that chunks with the same data are stored to the same storage system in the distributed topology 100, thereby enabling each local system 102 in the distributed topology 100 to independently identify and remove duplicate data. Accordingly, implementations herein do not require or employ a global deduplication management system.

In the example of FIG. 8, suppose that the user 128(N) sends a third object 801 with object data 802 that is the same as the object data 202 of the first object 201 discussed above, and object metadata 803. For instance, suppose that the user 128(N) uses the client device 122(N) to send the object 801 to the fourth system 102(4). The fourth system 102(4) may store the object metadata in its metadata data structure (not shown in FIG. 8) and may store the object data 802 in memory, disk, or other storage area.

Furthermore, the fourth system 102(4) may compute a hash value for the object data 802 using the same hash algorithm as was used by the first system 102(1) in the example discussed above with respect to FIGS. 2 and 3. Next, the fourth system 102(4) may determine the hash value modulo(4) for the object data 802. In this example, suppose that the result of the calculation of the hash modulo (4) returns a result of 1, as indicated at 804.

In addition, the fourth system 102(4) may divide the object data 802 into three data chunks 802(A), 802(B), and 802(C). Furthermore, the fourth system 102(4) may calculate a parity chunk 802(P) for the three data chunks 802(A)-802(C), as discussed above. The fourth system 102(4) is then ready to distribute the data chunks and/or the parity chunk to the other systems in the distributed topology as discussed additionally below with respect to FIG. 9.

Figure 9:
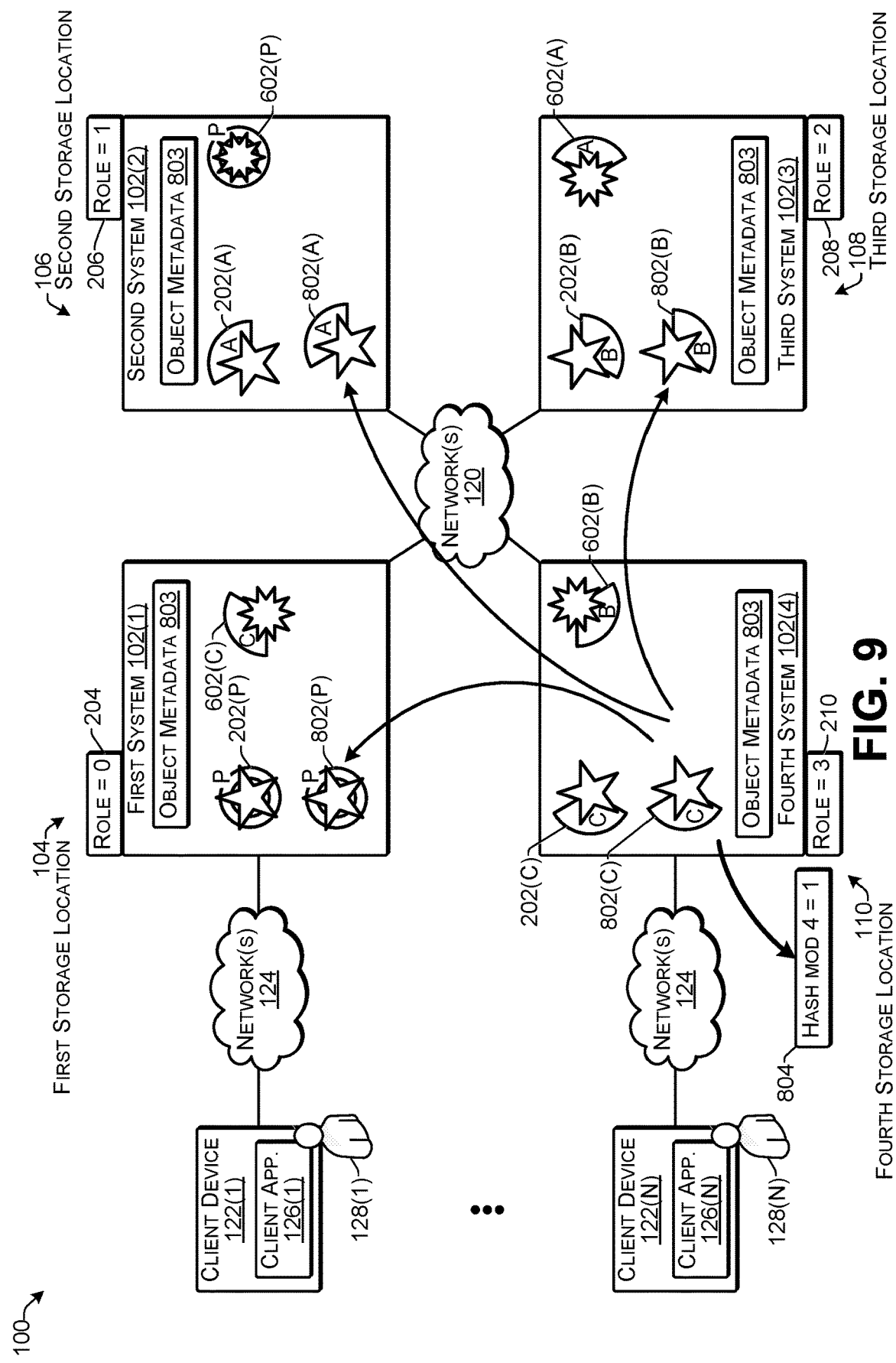
FIG. 9 illustrates an example of geographically distributing object chunks according to some implementations.

FIG. 9 illustrates an example of geographically distributing object chunks according to some implementations. As mentioned above, the fourth system 102(4) may compute the storage responsibilities for the object data using the hash modulo(4) operation, which returns a result of 1. This is the same result as when the first system 102(1) determined storage responsibilities for the first object 201, with the same object data 202. Accordingly, the distribution technique herein guarantees that the same object data will always be assigned the same storage responsibility for identical erasure coded chunks.

In this example, based on the calculation of the hash mod(4) being equal to 1, the first data chunk 802(A) is sent to the second system 102(2), since the second system has a role value equal to 1, as indicated at 206. Accordingly, the second data chunk 802(B) is sent to the third system 102(3) having a role value equal to 2, as indicated at 208; the third data chunk 802(C) is retained at the fourth system 102(4) having a role value equal to 3, as indicated at 210; and the parity chunk 802(P) is sent to the first system 102(1) having a role value equal to 0, as indicated at 204. Furthermore, as discussed above the object metadata 803 for the object 801, including the determined hash value, may also be sent to each of the respective systems 102(1), 102(2), and 102(3) with the respective chunks 802(P), 802(A), and 802(B), or in separate transmissions.

Figure 10:
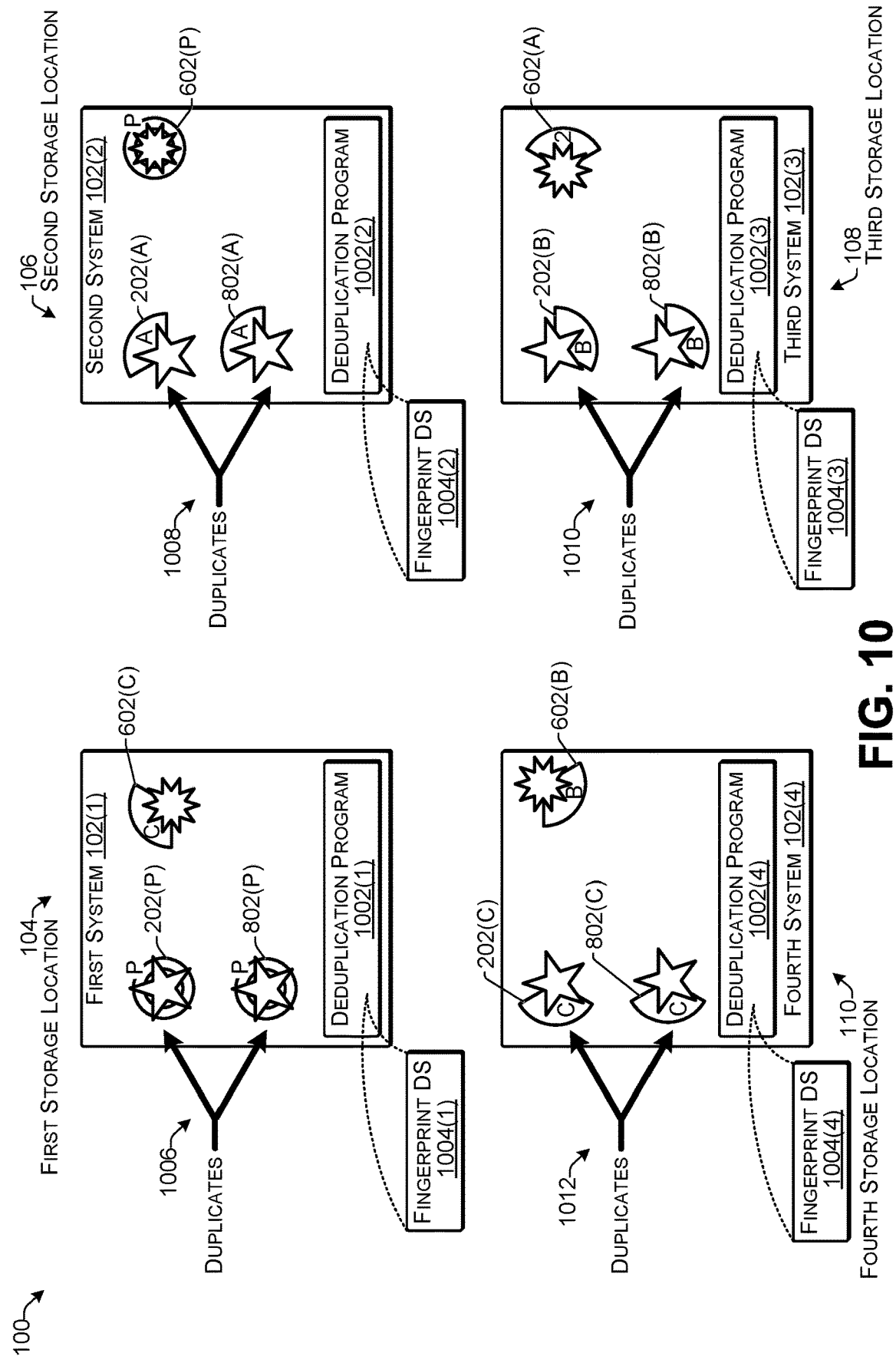
FIG. 10 illustrates an example of determining duplicate object chunks according to some implementations.

FIG. 10 illustrates an example of determining duplicate erasure coded object chunks according to some implementations. The individual storage systems 102(1)-102(4) at each storage location 104-110, respectively, may include a respective instance of a deduplication program 1002. Thus, the first system 102(1) includes a deduplication program 1002(1), the second system 102(2) includes a deduplication program at 1002(2), the third system 102(3) includes a deduplication program 1002(3), and the fourth system 102 (4) includes a deduplication program 1002(4). As mentioned above, implementations of the distribution techniques herein guarantee that duplicate erasure coded chunks of duplicate object data are always stored at the same storage location, and are therefore candidates for deduplication.

Various techniques for deduplication may be employed by the deduplication program 1002. As one example, the deduplication program 1002 may maintain a local fingerprint data structure 1004 that includes fingerprints of all the data chunks stored by the respective local system 102. Thus, the first system 102(1) includes a fingerprint data structure 1004(1), the second system 102(2) includes a fingerprint data structure 1004(2), the third system 102(3) includes a fingerprint data structure 1004(3), and the fourth system 102(4) includes a fingerprint data structure 1004(4).

For instance, the fingerprints may be generated to be indicative of the content of each chunk, such as through the use of a hash algorithm or other known fingerprinting technique. Consequently, when a new erasure coded chunk is received by the system 102, the deduplication program 1002 may generate a new fingerprint for the new chunk, and may compare the new fingerprint with the fingerprints already present in the fingerprint data structure 1004. If a match is found with a fingerprint already present in the fingerprint data structure 1004, the deduplication program may perform a more thorough comparison to ensure that the data is actually a duplicate, such as by performing a byte-by-byte comparison of the corresponding erasure coded chunks to confirm that the newly received chunk is actually a duplicate of a chunk that has already been received.

Accordingly, as indicated at 1006, the deduplication program 1002(1) on the first system 102(1) may determine that the newly received parity chunk 802(P) is a duplicate of the previously received parity chunk 202(P); as indicated at 1008, the deduplication program 1002(2) on the second system 102(2) may determine that the newly received data chunk 802(A) is a duplicate of the previously received data chunk 202(A); as indicated at 1010, the deduplication program 1002(3) on the third system 102(3) may determine that the newly received data chunk 802(B) is a duplicate of the previously received data chunk 202(B); and as indicated at 1012, the deduplication program 1002(4) on the fourth system 102(4) may determine that the data chunk 802(C) is a duplicate of the previously received data chunk 202(C).

Figure 11:
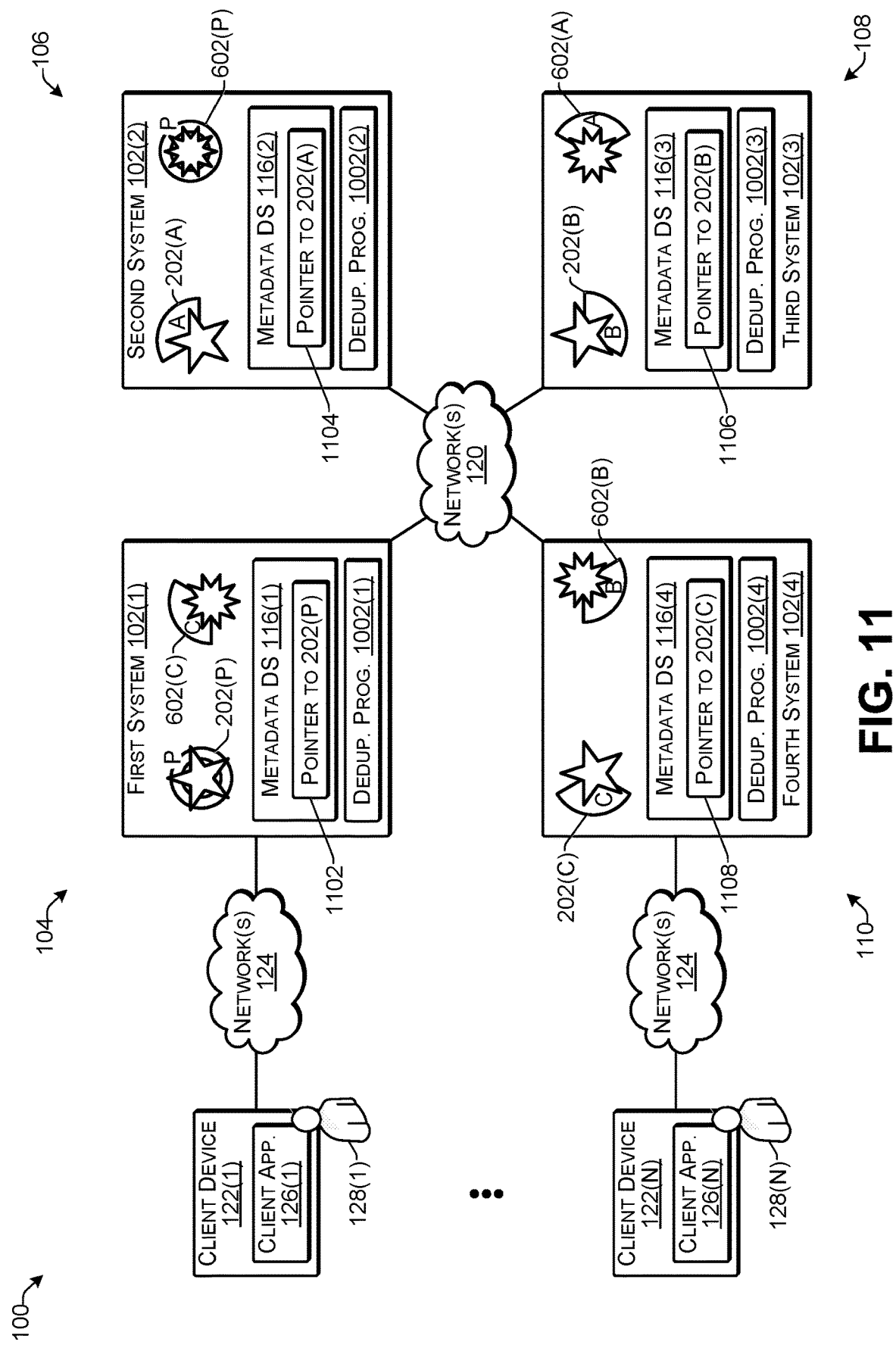
FIG. 11 illustrates an example of deduplicating duplicate object chunks according to some implementations.

FIG. 11 illustrates an example of deduplicating duplicate object chunks according to some implementations. Following the determination of the duplicate data, as discussed above with respect to FIG. 10, the individual systems 102 may perform deduplication of the duplicate data. As an example, the deduplication program 1002(1) on the first system 102(1) deletes the duplicate data, or otherwise marks the duplicate data for deletion, and adds, to the metadata data structure 116(1) a pointer 1102 that points to the existing data, e.g., the existing parity chunk 202(P). The deduplication program 1002(1) may associate the pointer 1102 with the object metadata 803 (not shown in FIG. 11) received for the newly received parity chunk 802 P (not shown in FIG. 11). Similarly, the deduplication program 1002(2) on the second system 102(2) deletes the duplicate data, or otherwise marks the duplicate data for deletion, and adds, to the metadata data structure 116(2) a pointer 1104 that points to the existing data, e.g., the existing data chunk 202(A). The deduplication program 1002(2) may associate the pointer 1104 with the object metadata 803 (not shown in FIG. 11) received for the newly received parity chunk 802(A) (not shown in FIG. 11). Additionally, the deduplication program 1002(3) on the third system 102(3) deletes the duplicate data, or otherwise marks the duplicate data for deletion, and adds, to the metadata data structure 116(3) a pointer 1106 that points to the existing data, e.g., the existing data chunk 202(B). The deduplication program 1002(3) may associate the pointer 1106 with the object metadata 803 (not shown in FIG. 11) received for the newly received parity chunk 802(B) (not shown in FIG. 11). Finally, the deduplication program 1002(4) on the fourth system 102(4) deletes the duplicate data, or otherwise marks the duplicate data for deletion, and adds, to the metadata data structure 116(4) a pointer 1108 that points to the existing data, e.g., the existing data chunk 202(C). The deduplication program 1002(4) may associate the pointer 1108 with the object metadata 803 (not shown in FIG. 11) received for the newly received parity chunk 802(B) (not shown in FIG. 11). Accordingly, by using the distribution and deduplication techniques herein the systems 102 are able to maintain maximum storage efficiency for erasure coded object data stored throughout the distributed topology 100.

Figure 12:
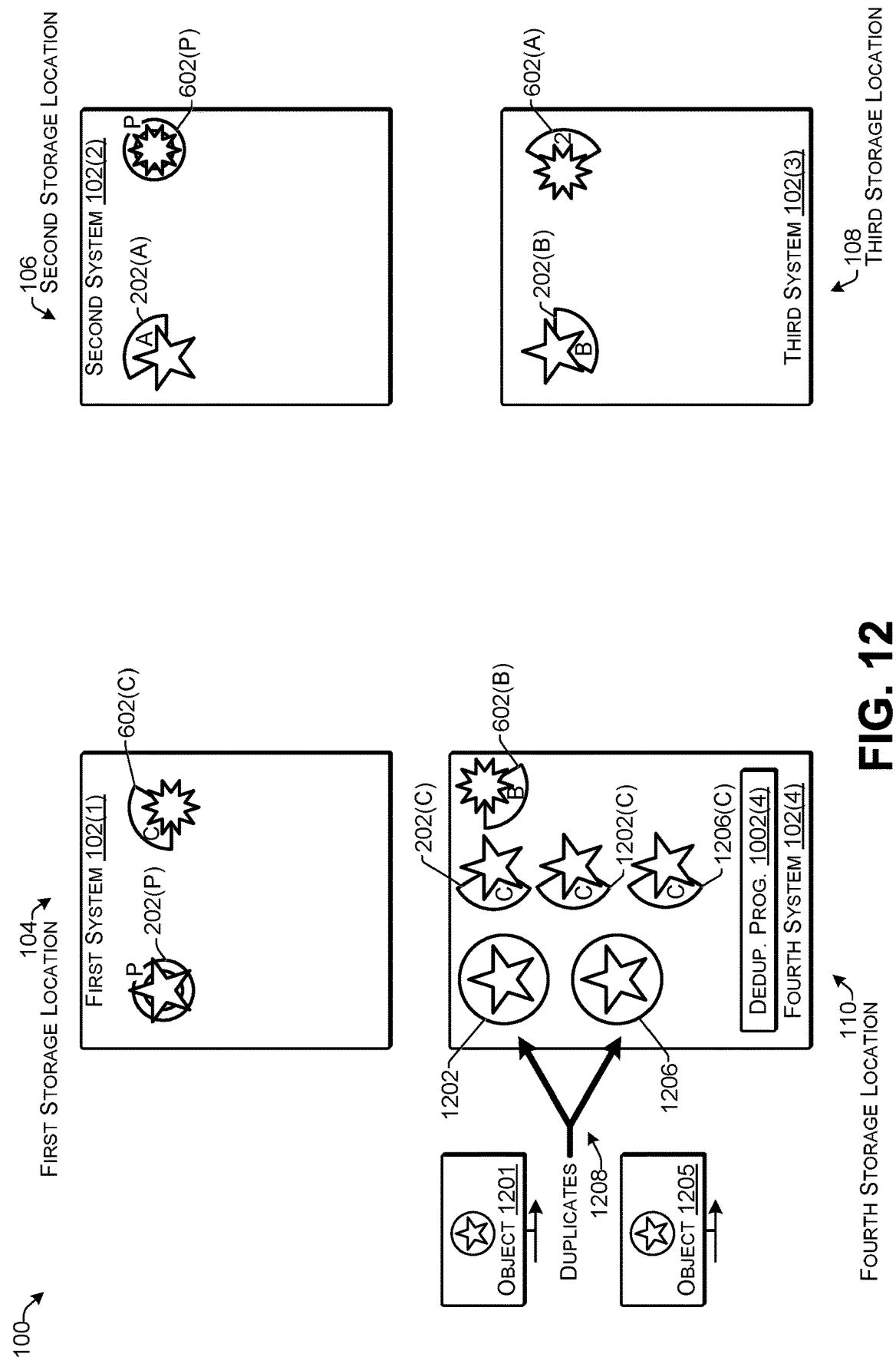
FIG. 12 illustrates an example of deduplicating duplicate object data before and after the object data is reduced to chunks according to some implementations.

FIG. 12 illustrates an example of deduplicating duplicate object data before and after the object data is reduced into chunks according to some implementations. In this example, suppose that the fourth system 102(4) receives two additional objects, a fourth object 1201 having object data 1202, and a fifth object 1205 having object data 1206. Furthermore, suppose in this example that the fourth system 102(4) is configured to keep a complete version of the object data for a specified threshold period of time, such as one week, two weeks, a month, or the like, before dividing the object data into chunks, computing parity, and distributing the chunks to the other systems 102(1)-102(3).

Accordingly, in this example, the deduplication program 1002(4), during the specified threshold time that the complete object data is maintained, determines that the fifth object data is 1206 is a duplicate of the fourth object data 1202, as indicated at 1208. When this occurs, the deduplication program 1002(4) deletes the fifth object data 1204 and creates a pointer associated with the metadata (not shown in FIG. 12) for the second object 1205 that points to the object data 1202 of the first object 1201.

Subsequently, suppose that the specified time threshold for maintaining a complete version of the object data 1202 for the fourth object 1201 expires, but the specified time threshold for maintaining a complete copy of the object data 1206 for the fifth object 1205 has not yet expired. Accordingly, the system 102(4) divides the object data 1202 into data chunks, determines a parity chunk, and sends individual chunks to the other systems 102(1)-102(3) based on the assigned roles, as discussed above, e.g., with respect to FIGS. 8 and 9. This results in the data chunk 1202(C) being retained on the fourth system 102(4). Subsequently, the deduplication program 1002(4) deduplicates the data chunk 1202(C) as discussed above with respect to FIG. 9 based on it being a duplicate of the chunk 202(C) already being stored by the system 102(4).

Furthermore, because there is still a pointer from the second object 1205 that points to the object data 1202, the object data 1202 is not yet deleted from the system 102(4). Subsequently, when the specified time threshold expires for keeping a complete version of the object data 1206, the system 102(4) divides the object data 1202 into data chunks, determines a parity chunk, and sends individual chunks to the other systems 102(1)-102(3) based on the assigned role values, as discussed above, e.g., with respect to FIGS. 8 and 9. This results in the data chunk 1206(C) being retained on the fourth system 102(4). Subsequently, the deduplication program 1002(4) deduplicates the data chunk 1206(C), as discussed above with respect to FIG. 9, based on it being a duplicate of the chunk 202(C) already being stored by the system 102(4).

Figure 13:
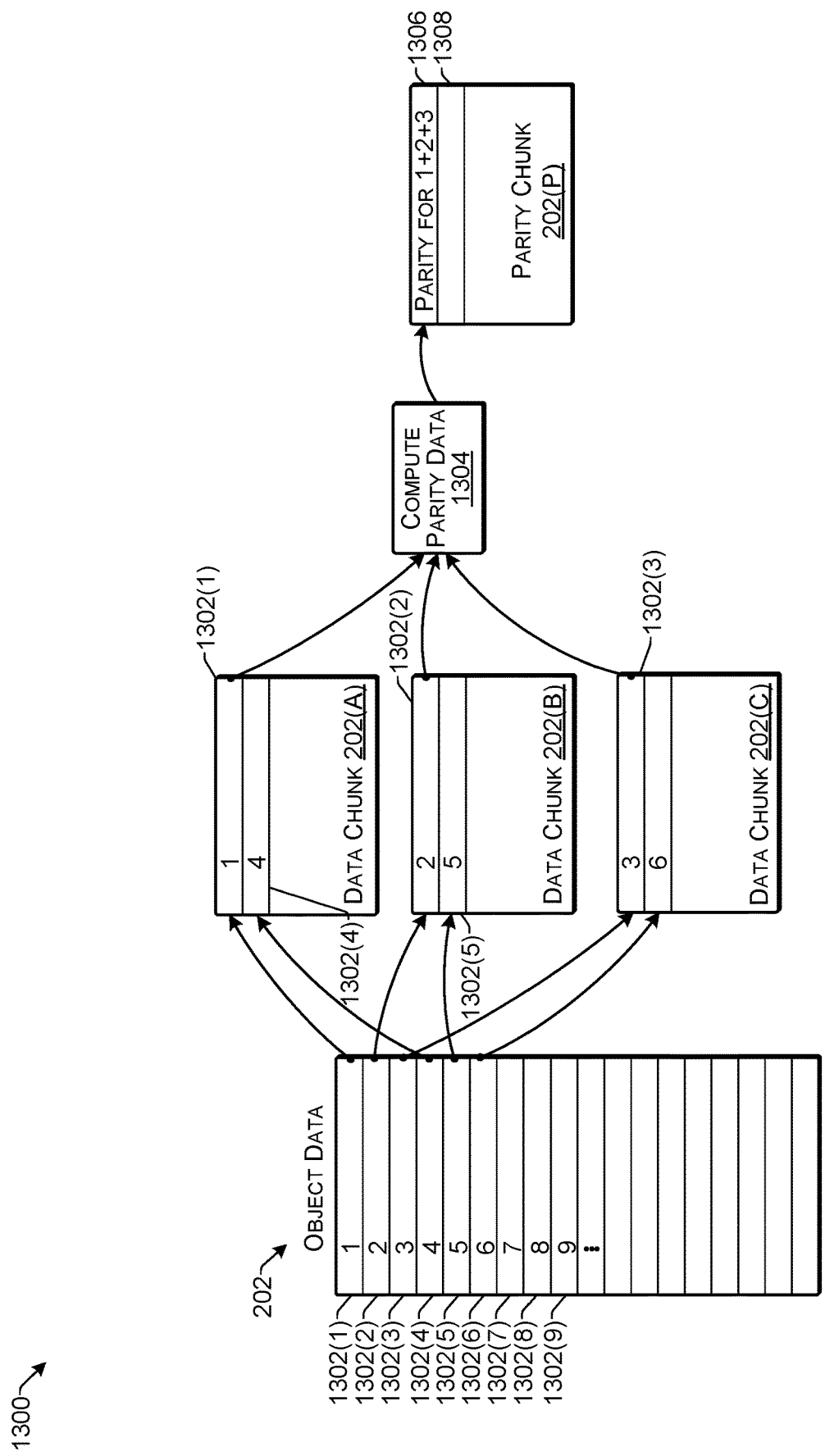
FIG. 13 illustrates an example of determining data chunks and a parity chunk according to some implementations.

FIG. 13 illustrates an example 1300 of determining data chunks and a parity chunk according to some implementations. In some examples, the object data 202 may be merely divided into three equal-sized chunks, as discussed above, such as by starting at the beginning of the data and making the first chunk from the first one third of the data, the second chunk from the second one third of the data, and the third chunk from the third one third of the data, and then calculating the parity from these three chunks.

In this example, however, the data chunks are created by interleaving blocks of the object data. Thus, initially, the object data 202 may be divided into a plurality of equally-sized blocks 1302 before dividing the object data 202 into chunks. For example, the block size may be any desired block size such as 256 bytes, 512 bytes, 1024 bytes, etc. As one example, the block size may be based on the size of the object data. For example, a very large data object may be divided into larger blocks while a smaller data object may be divided into smaller block sizes.

As illustrated, the object data 202 has a first block 1302(1), a second block 1302(2), a third block 1302(3), a fourth block 1302(4), a fifth block 1302(5), a sixth 1302(6), a seventh block 1302(7), an eighth block 1302(8), a ninth block 1302(9), and so forth. When creating the data chunks, in the sequence starting with the first block, the blocks are alternately added to the plurality of data chunks. Thus, the first block 1302(1) is added to the beginning of the first data chunk 202(A), the second block 1302(2) is added to the beginning of the second data chunk 202(B), and the third block 1302(3) is added to the beginning of the third data chunk 202(C). Next, the fourth block 1302(4) is added to the first data chunk 202(A) in a position following the first block 1302(1), the fifth block 1302(5) is added to the second data chunk 202(B) in a position following the second block 1302(2), and the sixth block 1302(6) is added to the third data chunk 202(C) in a position following the third block 1302(3). The process may continue until all the blocks 1302 in the object data 202 have been distributed to the data chunks 202(A)-202(C).

When calculating the parity chunk 202(P) for the three data chunks 202(A)-202(C), the system may perform the parity calculation using the interleaved blocks. Thus as indicated at 1304, the system may calculate parity for the first data block 1302(1) from the first data chunk 202(A), the second data block 1302(2) from the second data chunk 202(B), and the third data block 1302(3) from the third data chunk 202(C) for computing a first parity block 1306. Accordingly, the parity block 1306 includes parity data for the first three blocks 1302(1)-1302(3) of the object data 202. The calculation of the parity chunk 202(P) may continue in this manner by next selecting the data blocks 1302(4)-1302(6) for calculating the next parity block 1308, and so forth.

By configuring the data chunks in this interleaved manner and determining the parity chunk based on the interleaved data, then, when reconstructing object data using a parity chunk, it is possible to reconstruct a missing chunk using the parity chunk and also concatenate the reconstructed data with the data from the other two chunks in a single pass, since the blocks are small enough to maintain in memory during use of the parity data to recreate the missing chunk data and concatenation of the recreated data with the data from the blocks of the other data chunks. On the other hand, using the first technique discussed above of creating data chunks by just dividing the object data 202 into thirds may result in two passes being required when recreating missing data from parity data, i.e., one pass to compute the missing data from the parity data and store the computed data to a storage location, and a second pass to concatenate the recreated data with the data from the other chunks. Furthermore, while several examples of techniques for dividing the data into chunks and calculating the parity chunk have been described herein, numerous other variations will be apparent to those of skill in the art having the benefit of the disclosure herein.

Figure 14:
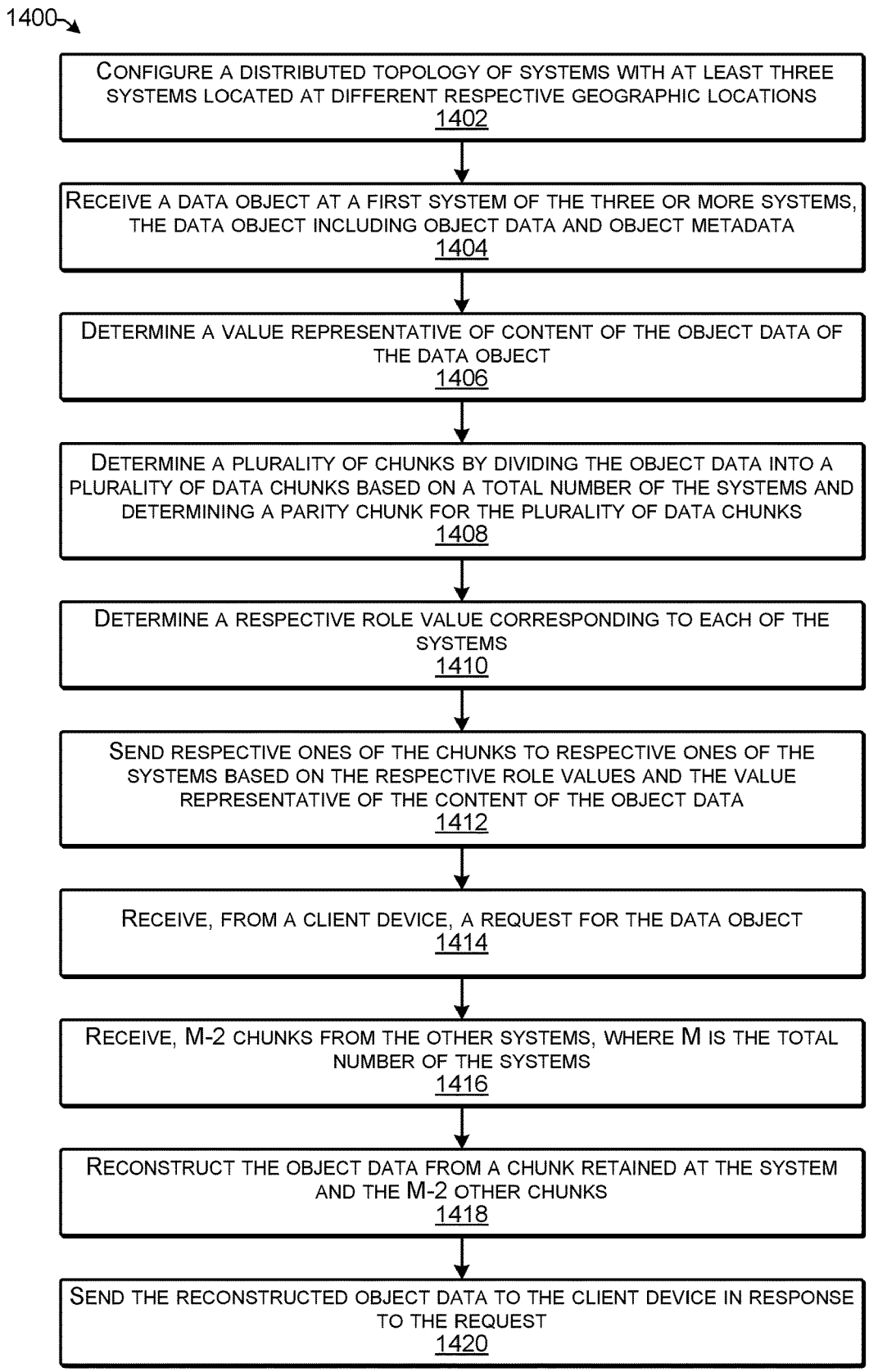
FIG. 14 is a flow diagram illustrating an example process for distributing object chunks according to some implementations.
Figure 15:
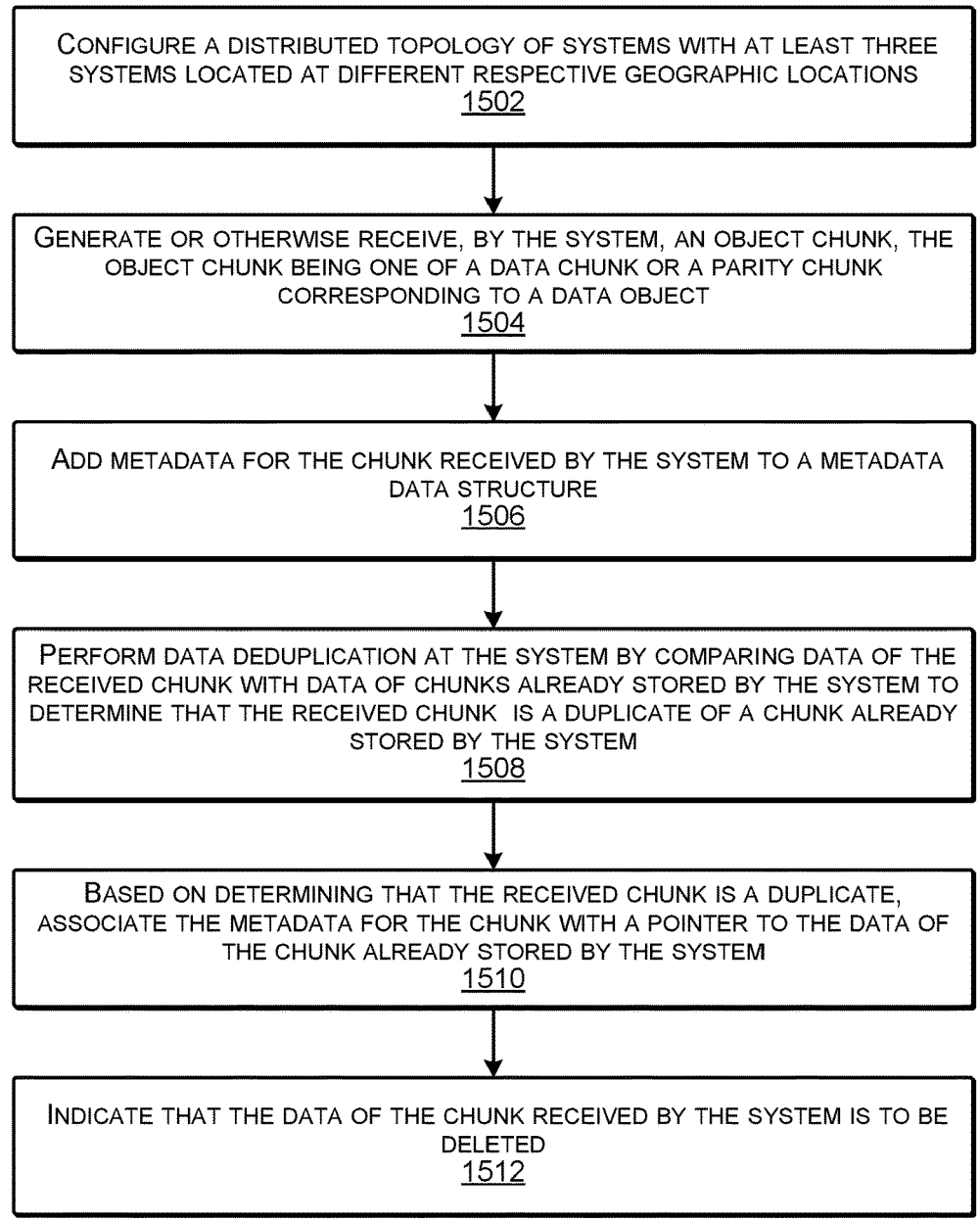
FIG. 15 is a flow diagram illustrating an example process 1500 for deduplicating object chunks according to some implementations.

FIGS. 14 and 15 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

FIG. 14 is a flow diagram illustrating an example process 1400 for distributing object chunks according to some implementations. In some cases, the process 1400 may be executed at least in part by at least one of the service computing devices 112 or other suitable computing device.

At 1402, the computing device may configure a distributed topology of systems with at least three systems located at different respective geographic locations. As one example, the systems may be located in different cities, different states, different countries, or may be otherwise located in different geographic regions.

At 1404, the computing device may receive a data object at a first system of the three or more systems, the data object including object data and object metadata.

At 1406, the computing device may determine a value representative of content of the object data of the data object.

At 1408, the computing device may determine a plurality of chunks by dividing the object data into a plurality of data chunks based on a total number of the systems and determining a parity chunk for the plurality of data chunks.

At 1410, the computing device may determine a respective role value corresponding to each of the systems.

At 1412, the computing device may send respective ones of the chunks to respective ones of the systems based on the respective role values and the value representative of the content of the object data.

At 1414, the computing device may receive, from a client device, a request for the data object.

At 1416, the computing device may receive, M−2 chunks from the other systems, where M is the total number of the systems.

At 1418, the computing device may reconstruct the object data from a chunk retained at the system and the M−2 other chunks.

At 1420, the computing device may send the reconstructed object data to the client device in response to the request.

FIG. 15 is a flow diagram illustrating an example process 1500 for deduplicating object chunks according to some implementations. In some cases, the process 1500 may be executed at least in part by the service computing device(s) 112 or other suitable computing device(s). In some examples, the process 1500 may be executed in combination with the process 1400 discussed above.

At 1502, the computing device may configure a distributed topology of systems with at least three systems located at different respective geographic locations.

At 1504, the computing device may generate or otherwise receive an object chunk, the object chunk being one of a data chunk or a parity chunk corresponding to a data object.

At 1506, the computing device may add metadata for the chunk received by the system to a metadata data structure.

At 1508, the computing device may perform data deduplication at the system by comparing data of the received chunk with data of chunks already stored by the system to determine that the received chunk is a duplicate of a chunk already stored by the system.

At 1510, based on determining that the received chunk is a duplicate, the computing device may associate the metadata for the chunk with a pointer to the data of the chunk already stored by the system.

At 1512, the computing device may indicate that the data of the chunk received by the system is to be deleted.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 16:
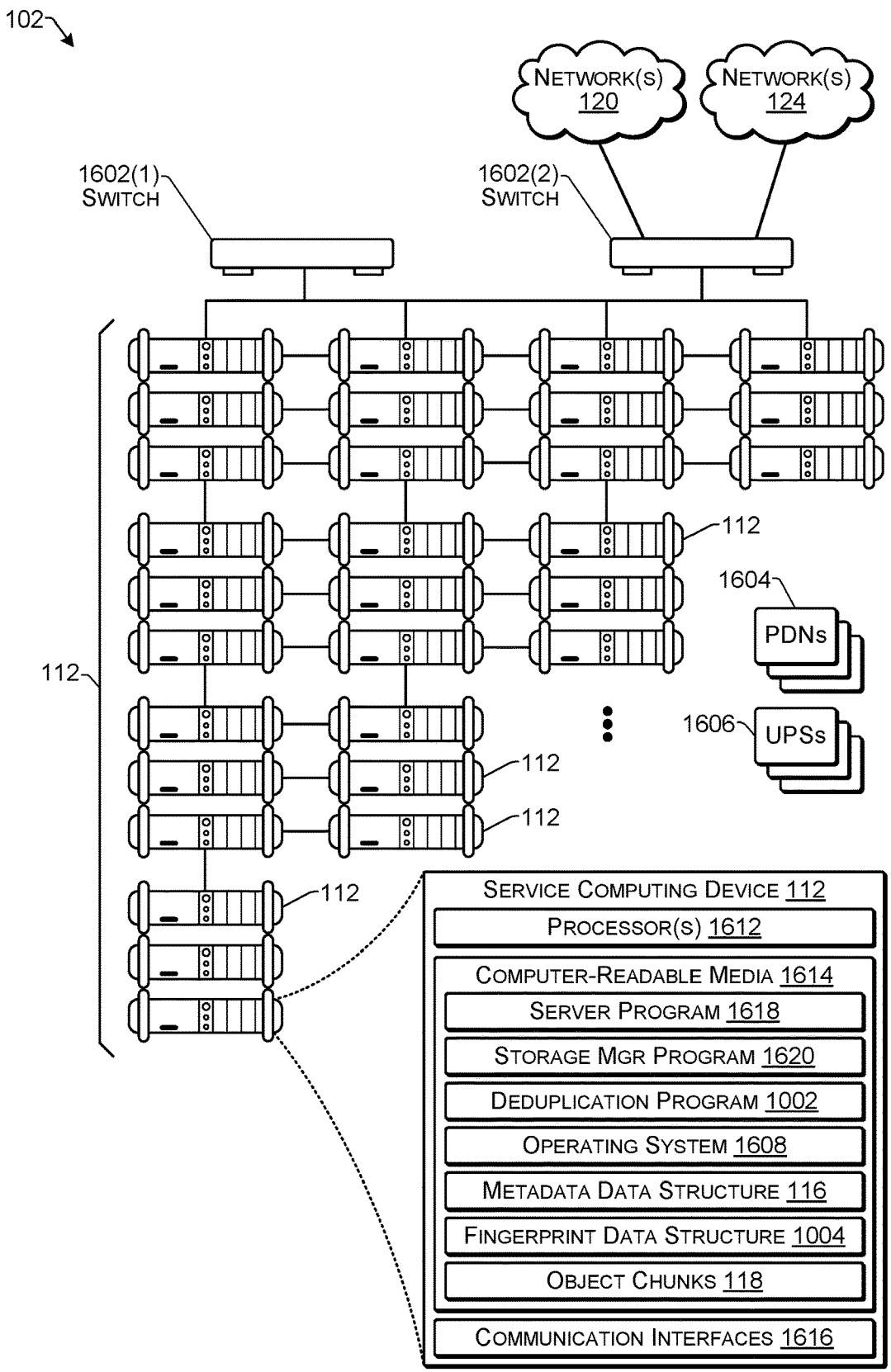
FIG. 16 illustrates an example configuration of a computing system according to some implementations.

FIG. 16 illustrates an example configuration of a computing system 102 according to some implementations. In this example, the computing system 102 may be a cluster or other plurality of service computing devices 112 (also referred to as nodes herein) configured to be able to perform the functions of an object storage system as described herein. In some examples, the computing system 102 may be referred to as a redundant array of independent nodes (RAIN) that are networked together. In the illustrated example, a plurality of the service computing devices 112 are in communication with a pair of network switches 1602. The network switches 1602 may comprise a first switch 1602(1) that serves as an internal switch to enable peer-to-peer communication between service computing devices 112, and a second switch 1602(2) that serves as an external switch to enable external access to the service computing devices 112. Each switch 1602 may include enough ports to handle all potential service computing devices 112 in a cluster or other computing system configuration.

The computing system 102 in this example may also include power distribution units (PDUs) 1604 and uninterruptible power supplies (UPSs) 1606. The PDUs 1604 are used to power the service computing devices 112 and switches 1602, and the UPSs 1606 may protect the nodes and switches in case of power fluctuations and/or failures. As mentioned above, the computing system 102 may be connected to a network, such as the one or more networks 120 and 124 discussed above, which may include the Internet or other WAN, a LAN, or other types of networks, as enumerated elsewhere herein.

The service computing devices 112 may be homogeneous or heterogeneous. A typical service computing device 112 may execute an operating system 1608, such as LINUX®, WINDOWS®, or the like. Additionally, some or all of the service computing devices 112 may include or may access one or more hard disk drives (HDDs) and/or one or more solid-state drives (SSDs) for storing object data and/or system data, as discussed additionally below. As one example, the service computing devices 112 may include one or more servers or other types of computing devices that may be embodied in any number of ways. For instance, in the case of a server, the modules, other functional components, and at least a portion of data storage may be implemented on at least one server, such as in a cluster of servers, a server farm or data center, a cloud-hosted computing service, and so forth, although other computer architectures may additionally or alternatively be used.

In the illustrated example, an example service computing device 112 includes, or may have associated therewith, one or more processors 1612, one or more computer-readable media 1614, and one or more communication interfaces 1616. Each processor 1612 may be a single processing unit or a number of processing units, and may include single or multiple computing units or multiple processing cores. The processor(s) 1612 can be implemented as one or more central processing units, microprocessors, microcomputers, microcontrollers, digital signal processors, state machines, logic circuitries, graphics processing units, and/or any devices that manipulate signals based on operational instructions. For instance, the processor(s) 1612 may be one or more hardware processors and/or logic circuits of any suitable type specifically programmed or configured to execute the algorithms and processes described herein. The processor(s) 1612 can be configured to fetch and execute computer-readable instructions stored in the computer-readable media 1614, and these instructions can program the processor(s) 1612 to perform the functions described herein.

In some cases, the computer-readable media 1614 may include at least a portion of the storage devices 114 discussed above with respect to FIG. 1. The storage devices may include SSDs and/or HDDs or the like. Further, the computer-readable media 1614 may include volatile and nonvolatile memory and/or removable and non-removable media implemented in any type of technology for storage of information, such as computer-readable instructions, data structures, program modules, or other data. Accordingly, the computer-readable media 1614 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the node 102, the computer-readable media 1614 may be a tangible non-transitory medium to the extent that, when mentioned, non-transitory computer-readable media exclude media such as energy, carrier signals, electromagnetic waves, and/or signals per se.

The computer-readable media 1614 may be used to store any number of functional components that are executable by the processor(s) 1612. In many implementations, these functional components may be one or more computer programs, applications, or portions thereof, executable code, or other executable instructions that are executable by the processor(s) 1612 and that, when executed, specifically program the processor(s) 1612 to perform the actions attributed herein to the service computing device(s) 112. Functional components stored in the computer-readable media 1614 may include a server program 1618 that may communicate with the client devices such as for sending data objects to the client devices and receiving data objects from the client devices. The functional components may further include a storage manager program 1620, which may perform the erasure coding and storage management algorithms discussed herein, such as for dividing objects into chunks, determining parity chunks, and distributing the chunks to other systems in a distributed topology based on assigned roles. In addition, the storage manager program 1620 may include, or may access, the deduplication program 1002 that may provide one or more of the deduplication algorithms described herein, such as described above with respect to FIGS. 9-12. Additional functional components stored in the computer-readable media 1614 may include the operating system 1608 for controlling and managing various functions of the service computing devices 112. As one example, these functional components may be stored in a storage portion of the computer-readable media 1614, loaded into a local memory portion of the computer-readable media 1614, and executed by the one or more processors 1612.

In addition, the computer-readable media 1614 may store data and data structures used for performing the functions and services described herein. For example, the computer-readable media 1614 may store the metadata data structure 116 for maintaining metadata about the object chunks 118 stored by the system 102. The computer-readable media 1614 may also store the fingerprint data structure 1004 that may be used by the deduplication program 1002. In addition, the computer-readable media 1614 may store the object chunks 118. The service computing devices 112 may also include or maintain other functional components and data, which may include programs, drivers, etc., and the data used or generated by the functional components. Further, the service computing devices 112 may include many other logical, programmatic, and physical components, of which those described above are merely examples that are related to the discussion herein.

The communication interface(s) 1616 may include one or more interfaces and hardware components for enabling communication with various other devices, such as over the network(s) 120 and 124 discussed above. For example, communication interface(s) 1616 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein. Further, the example of the computing system 102 described above is but one example of a computing system 102 suitable for use as an object storage system that may perform the functions described in the examples herein.

Figure 17:
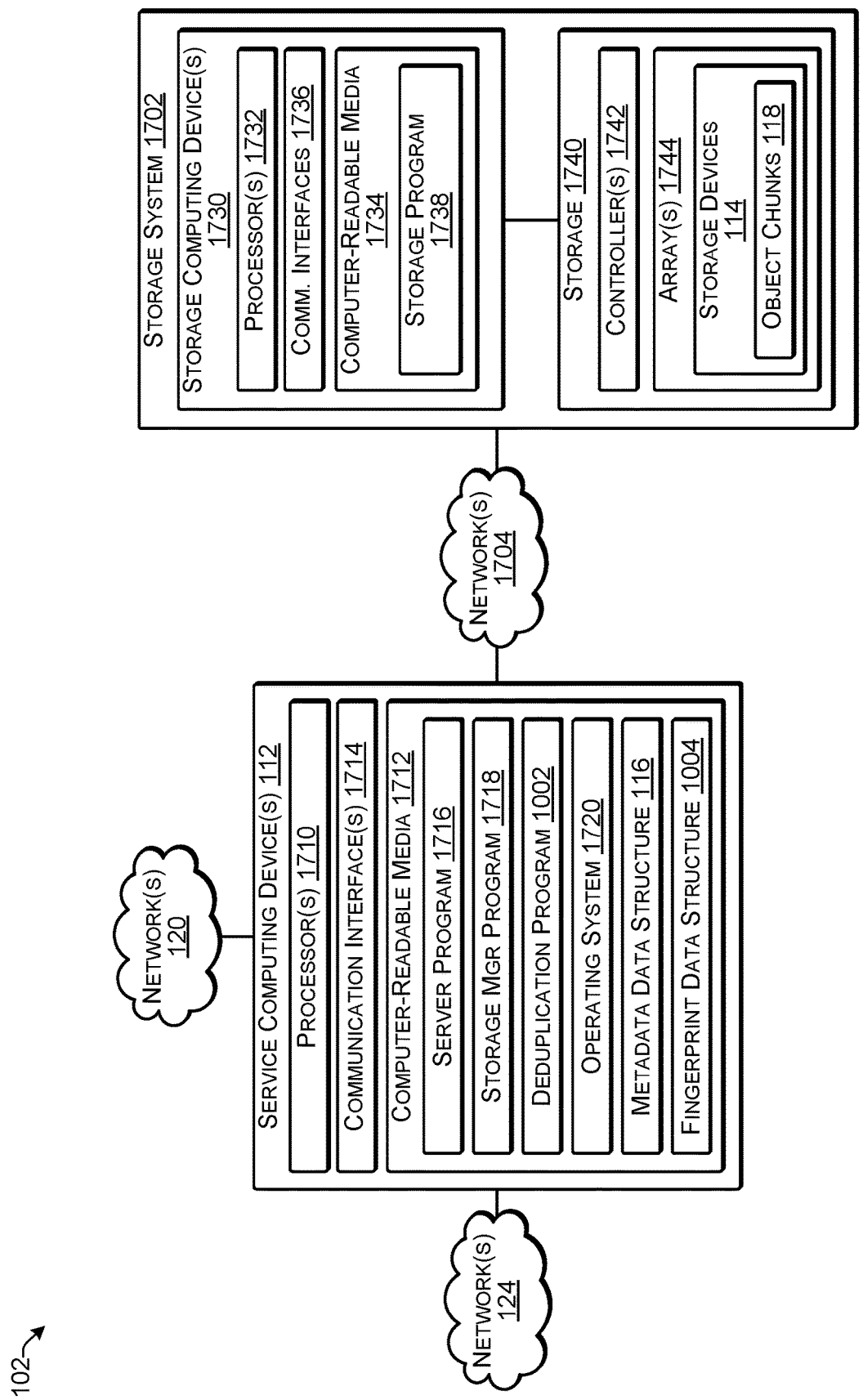
FIG. 17 illustrates an example configuration of a computing system according to some implementations.

FIG. 17 illustrates another example configuration of a computing system 102 according to some implementations. The system 102 includes a least one service computing device 112 that is able to communicate with, or is otherwise coupled to, a storage system 1702, such as through one or more networks 1704. Typically, the one or more networks 1704 may include a LAN, a storage area network (SAN), such as a Fibre Channel network, or the like, but are not limited to such, and may include other types of networks as discussed herein, a direct connection, or the like.

In some examples, the at least one service computing device 112 may include one or more servers or other types of computing devices that may be embodied in any number of ways. For instance, in the case of a server, the programs, other functional components, and at least a portion of data storage may be implemented on at least one server, such as in a plurality of servers, a server farm, a data center, a cloud-hosted computing service, and so forth, although other computer architectures may additionally or alternatively be used. In the illustrated example, the service computing device 112 includes, or may have associated therewith, one or more processors 1710, one or more computer-readable media 1712, and one or more communication interfaces 1714.

Each processor 1710 may be a single processing unit or a number of processing units, and may include single or multiple computing units, or multiple processing cores. The processor(s) 1710 can be implemented as one or more central processing units, microprocessors, microcomputers, microcontrollers, digital signal processors, state machines, logic circuitries, graphics processors, and/or any devices that manipulate signals based on operational instructions. As one example, the processor(s) 1710 may include one or more hardware processors and/or logic circuits of any suitable type specifically programmed or configured to execute the algorithms and processes described herein. The processor(s) 1710 may be configured to fetch and execute computer-readable instructions stored in the computer-readable media 1712, which may be executed to program the processor(s) 1710 to perform the functions described herein.

The computer-readable media 1712 may include volatile and nonvolatile memory and/or removable and non-removable media implemented in any type of technology for storage of information, such as computer-readable instructions, data structures, program modules, or other data. For example, the computer-readable media 1712 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 112, the computer-readable media 1712 may be a tangible non-transitory medium to the extent that, when mentioned, non-transitory computer-readable media exclude media such as energy, carrier signals, electromagnetic waves, and/or signals per se. In some cases, the computer-readable media 1712 may be at the same location as the service computing device 112, while in other examples, the computer-readable media 1712 may be partially remote from the service computing device 112. For instance, in some cases, the computer-readable media 1712 may include a portion of storage in the storage system 1702.

The computer-readable media 1712 may be used to store any number of functional components that are executable by the processor(s) 1710. In many implementations, these functional components comprise instructions or programs that are executable by the processor(s) 1710 and that, when executed, specifically program the processor(s) 1710 to perform the actions attributed herein to the service computing device 112. Functional components stored in the computer-readable media 1712 may include a server program 1716, a storage manager program 1718, and the deduplication program 1002, each of which may include one or more computer programs, applications, or portions thereof, executable code, or other executable instructions. For example, the server program 1716 may provide communication functionality with the client devices and the storage system 1702. The storage manager program 1718 may include a database management function for creating and managing the metadata data structure 116 containing object metadata, or the like, corresponding to object data, including the object chunks 118, stored at the storage system 1702. The storage manager program 1718 may further perform the functions of dividing objects into chunks, erasure coding the chunks, distributing the chunks, and using the deduplication program 1002 for deduplicating the storage system 1702. Additional functional components stored in the computer-readable media 1712 may include an operating system 1720 for controlling and managing various functions of the service computing device 112. In some cases, the functional components may be stored in a storage portion of the computer-readable media 1712, loaded into a local memory portion of the computer-readable media 1712, and executed by the one or more processors 1710.

In addition, the computer-readable media 1712 may store data and data structures used for performing the functions and services described herein. For example, the computer-readable media 1712 may store the metadata data structure 116 and the fingerprint data structure 1004. The service computing device 112 may also include or maintain other functional components and data, which may include programs, drivers, etc., and the data used or generated by the functional components. Further, the service computing device 112 may include many other logical, programmatic, and physical components, of which those described above are merely examples that are related to the discussion herein.

The communication interface(s) 1714 may include one or more interfaces and hardware components for enabling communication with various other devices, such as over the one or more network(s) 120, 124 and 1704. Thus, the communication interfaces 1714 may include, or may couple to, one or more ports that provide connection for communicating with the storage system 1702, and one or more ports that provide connection to the network(s) 120 for communication with the client devices 108. For example, the communication interface(s) 1714 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

The storage system 1702 may include one or more storage computing devices 1730, which may include one or more servers or any other suitable computing device, such as any of the examples discussed above with respect to the service computing device 112. The storage computing device(s) 1730 may each include one or more processors 1732, one or more computer-readable media 1734, and one or more communication interfaces 1736. For example, the processors 1732 may correspond to any of the examples discussed above with respect to the processors 1710, the computer-readable media 1734 may correspond to any of the examples discussed above with respect to the computer-readable media 1712, and the communication interfaces 1736 may correspond to any of the examples discussed above with respect to the communication interfaces 1714.

In addition, the computer-readable media 1734 may include a storage program 1738 as a functional component executed by the one or more processors 1732 for managing the storage of data on a storage 1740 included in the storage system 1702. The storage 1740 may include one or more controllers 1742 associated with the storage 1740 for storing data on one or more arrays 1744 of storage devices 114. For instance, the controller 1742 may control the arrays 1744, such as for configuring the arrays 1744 in a RAID configuration, or any other suitable storage configuration, and/or for presenting logical units based on the storage devices 114 to the storage program 1738, and for managing data, such as data objects 118, stored on the underlying physical storage devices 114. The storage devices 114 may be any type of storage device, such as hard disk drives, solid state drives, optical drives, magnetic tape, combinations thereof, and so forth. Additionally, while several example systems have been described, numerous other systems able to implement the distributed object storage, erasure coding, and deduplication techniques herein will be apparent to those of skill in the art having the benefit of the disclosure herein.

Various instructions, processes, and techniques described herein may be considered in the general context of computer-executable instructions, such as program modules stored on computer-readable media, and executed by the processor(s) herein. Generally, program modules include routines, programs, objects, components, data structures, executable code, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
one or more processors; and
one or more non-transitory computer-readable media maintaining executable instructions, which, when executed by the one or more processors, configure the one or more processors to perform operations comprising:
receiving a data object at the system, the data object including object data and object metadata related to the data object, wherein the system is a first system of three or more systems, each system located at a different respective geographic location;
determining a value representative of content of the object data of the data object;
determining a plurality of chunks by dividing the object data into a plurality of data chunks based on a total number of the systems and determining a parity chunk for the plurality of data chunks, wherein:
the plurality of data chunks are determined by dividing the object data into a plurality of blocks and inserting individual blocks sequentially into alternate respective data chunks to interleave blocks of the object data in the plurality of data chunks to generate the plurality of data chunks with interleaved blocks of the object data, and
the parity chunk is determined from the plurality of data chunks having interleaved blocks by generating a respective block of the parity chunk based on a respective block from each of the data chunks having interleaved data;
determining a respective role value corresponding to each of the systems; and
sending respective ones of the chunks and at least a portion of the received object metadata to respective ones of the systems based on the respective role values and the value representative of the content of the object data.

2. The system as recited in claim 1, wherein:
determining the value representative of the content of the object data of the data object includes determining the value representative of the content from a complete version of the object data; and
the operation of sending respective ones of the chunks and at least a portion of the received object metadata to respective ones of the systems based on the respective role values and the value representative of the content of the object data is based on determining the value representative of the content of the object data from a complete version of the received object data.

3. The system as recited in claim 2, the operations further comprising:
determining, using a hashing algorithm, a hash value from the complete version of the object data as the value representative of the content; and
determining the respective systems to receive the respective chunks based on a function of the hash value and the respective role values, wherein the operation of determining the respective systems to receive the respective chunks based on the function of the hash value and the respective role values further comprises:
determining a result of a modulo operation on the hash value, wherein the modulo operation is based on the total number of the systems;
determining the respective systems to receive the respective chunks based on the result of the modulo operation and the respective role values; and
sending the respective chunks and at least the portion of the received metadata to respective ones of the systems by matching the result of the modulo operation to one of the role values and distributing the chunks in a sequence based on ascending or descending role values.

4. The system as recited in claim 2, the operations further comprising:
determining, using a hashing algorithm, a hash value from the complete version of the object data as the value representative of the content; and determining the respective systems to receive the respective chunks based on a function of the hash value and the respective role values, wherein the operation of determining the respective systems to receive the respective chunks based on the function of the hash value and the respective role values further comprises:

determining a result of a modulo operation on the hash value, wherein the modulo operation is based on the total number of the systems;

determining the respective systems to receive the respective chunks based on the result of the modulo operation and the respective role values; and sending the respective chunks and at least the portion of the received metadata to respective ones of the systems using a round robin distribution by matching the result of the modulo operation to one of the role values and distributing the chunks in a sequence based on ascending or descending role values, wherein the sequence is based on an order of data in the content of the object data.

5. The system as recited in claim 1, the operations further comprising retaining one of the chunks by the system based on the role value assigned to the system so that one chunk of the plurality of chunks is maintained at each system of the three or more systems.

6. The system as recited in claim 1, wherein the object metadata related to the object that is received with the object includes at least one of: an object name, an object type, object size, object owner, or a creation date; and sending, to each system that receives a chunk, at least a portion of the object metadata includes sending at least one of: the object name, the object type, the object size, the object owner, or the creation date in addition to sending the value representative of the content.

7. The system as recited in claim 1, the operations further comprising performing deduplication at the system by comparing data of a chunk retained by the system with data of chunks already stored by the system to determine that the chunk retained by the system is a duplicate of a chunk already stored by the system.

8. The system as recited in claim 7, the operations further comprising:

adding the metadata related to the object and corresponding to the chunk retained by the system to a metadata data structure;

associating the metadata related to the object and corresponding to the chunk retained by the system with a pointer to the data of the chunk already stored by the system; and indicating that the data of the chunk retained by the system is to be deleted.

9. The system as recited in claim 7, wherein each other system of the three or more systems, located at the different respective geographic locations is configured to determine whether the chunk received by that system has data that is a duplicate of data of a chunk already received by that system.

10. The system as recited in claim 7, wherein the operation of comparing the data of the chunk retained by the system with the data of the chunks already stored by the system further comprises:

determining a fingerprint representative of the data of the chunk retained by the system;

comparing the fingerprint with a plurality of fingerprints in a fingerprint data structure previously generated for a plurality of respective chunks already stored by the system; and based on a match between the fingerprint and one of the fingerprints in the fingerprint data structure, performing a byte-by-byte comparison of the data of the chunk retained by the system and the data of the chunk already stored by the system corresponding to the matched fingerprint in the fingerprint data structure.

11. The system as recited in claim 1, wherein the system is configured to retain a complete version of the object data for a threshold time, the operations further comprising:

determining that the object data is a duplicate of data already stored by the system;

creating, for the data object, a pointer to the data already stored by the system;

indicating that the object data is to be deleted;

determining that the threshold time has expired; and using the data already stored by the system as the object data for determining the plurality of chunks.

12. The system as recited in claim 1, the operations further comprising:

receiving, from a client device, a request for the data object;

receiving, M−2 chunks from the other systems, where M is the total number of the systems;

reconstructing the object data from a chunk retained at the system and the M−2 chunks; and sending the reconstructed object data and at least some of the received object metadata to the client device.

13. The system as recited in claim 12, wherein one of the M−2 chunks or the chunk retained at the system is the parity chunk, the operations further comprising:

determining data for a missing data chunk using the parity chunk and others of the M−2 chunks and the chunk retained at the system; and reconstructing the object data using the data for the missing data chunk determined using the parity chunk and others of the M−2 chunks and the chunk retained at the system.

14. A method comprising:

receiving at a system, by one or more processors of the system, a data object including object data and object metadata related to the data object, wherein the system is a first system of three or more systems, each system located at a different respective geographic location;

determining, by the one or more processors, a value representative of content of the object data of the data object;

determining, by the one or more processors, a plurality of chunks by dividing the object data into a plurality of data chunks based on a total number of the systems and determining a parity chunk for the plurality of data chunks, wherein:

the plurality of data chunks are determined by dividing the object data into a plurality of blocks and inserting individual blocks sequentially into alternate respective data chunks to interleave blocks of the object data in the plurality of data chunks to generate the plurality of data chunks with interleaved blocks of the object data, and the parity chunk is determined from the plurality of data chunks having interleaved blocks by generating a respective block of the parity chunk based on a respective block from each of the data chunks having interleaved data;

determining, by the one or more processors, a respective role value corresponding to each of the systems; and sending, by the one or more processors, respective ones of the chunks and at least a portion of the received object metadata to respective ones of the systems based on the respective role values and the value representative of the content of the object data.

15. The method as recited in claim 14 further comprising:
receiving, from a client device, a request for the data object;
receiving, M−2 chunks from the other systems, where M is the total number of the systems; and
reconstructing the object data from a chunk retained at the system and the M−2 chunks; and
sending the reconstructed object data and at least a portion of the received metadata related to the data object to the client device.

16. The method as recited in claim 15, wherein one of the M−2 chunks or the chunk retained at the system is the parity chunk, the method further comprising:
determining data for a missing data chunk using the parity chunk and others of the M−2 chunks and the chunk retained at the system; and
reconstructing the object data using the data for the missing data chunk determined using the parity chunk and others of the M−2 chunks and the chunk retained at the system.

17. The method as recited in claim 16 further comprising concatenating reconstructed object data with the object data to recreate the data object from the data chunks and the parity chunk during a single pass through the object data of the data chunks.

18. One or more non-transitory computer-readable media storing instructions that, when executed by one or more processors, program the one or more processors of a system to perform operations comprising:
receiving a data object at the system, the data object including object data and object metadata related to the data object, wherein the system is a first system of three or more systems, each system located at a different respective geographic location;
determining a value representative of content of the object data of the data object;
determining a plurality of chunks by dividing the object data into a plurality of data chunks based on a total number of the systems and determining a parity chunk for the plurality of data chunks, wherein:
the plurality of data chunks are determined by dividing the object data into a plurality of blocks and inserting individual blocks sequentially into alternate respective data chunks to interleave the object data in the plurality of data chunks to generate the plurality of data chunks with interleaved blocks of the object data, and
the parity chunk is determined from the plurality of data chunks having interleaved blocks by generating a respective block of the parity chunk based on a respective block from each of the data chunks having interleaved data;
determining a respective role value corresponding to each of the systems; and
sending respective ones of the chunks and at least a portion of the received object metadata to respective ones of the systems based on the respective role values and the value representative of the content of the object data.

19. The one or more non-transitory computer-readable media as recited in claim 18, the operations further comprising:
receiving, from a client device, a request for the data object;
receiving, M−2 chunks from the other systems, where M is the total number of the systems;
reconstructing the object data from a chunk retained at the system and the M−2 chunks; and
sending the reconstructed object data to the client device.

20. The one or more non-transitory computer-readable media as recited in claim 19, wherein one of the M−2 chunks or the chunk retained at the system is the parity chunk, the operations further comprising:
determining data for a missing data chunk using the parity chunk and others of the M−2 chunks and the chunk retained at the system; and
reconstructing the object data using the data for the missing data chunk determined using the parity chunk and others of the M−2 chunks and the chunk retained at the system.

* * * * *